United States Patent
Misawa et al.

(10) Patent No.: US 11,361,555 B2
(45) Date of Patent: Jun. 14, 2022

(54) ROAD ENVIRONMENT MONITORING DEVICE, ROAD ENVIRONMENT MONITORING SYSTEM, AND ROAD ENVIRONMENT MONITORING PROGRAM

(71) Applicant: DENSO CORPORATION, Kariya (JP)

(72) Inventors: Hideaki Misawa, Kariya (JP); Kenji Muto, Kariya (JP)

(73) Assignee: DENSO CORPORATION, Kariya (JP)

( * ) Notice: Subject to any disclaimer, the term of this patent is extended or adjusted under 35 U.S.C. 154(b) by 70 days.

(21) Appl. No.: 16/917,078

(22) Filed: Jun. 30, 2020

(65) Prior Publication Data

US 2021/0004612 A1 Jan. 7, 2021

(30) Foreign Application Priority Data

Jul. 2, 2019 (JP) .............................. JP2019-123968

(51) Int. Cl.
*G06V 20/58* (2022.01)
*G06T 7/70* (2017.01)
(Continued)

(52) U.S. Cl.
CPC ............ *G06V 20/58* (2022.01); *G06T 7/0002* (2013.01); *G06T 7/70* (2017.01); *G06V 10/40* (2022.01); *G06T 2207/30261* (2013.01)

(58) Field of Classification Search
CPC ........ G06K 9/00805; G06K 9/46; G06T 7/70; G06T 7/0002; G06T 2207/30261; G06V 20/58; G06V 10/40
See application file for complete search history.

(56) References Cited

U.S. PATENT DOCUMENTS

| 10,322,728 | B1 * | 6/2019 | Porikli ................. G06K 9/6288 |
| 2015/0006132 | A1 * | 1/2015 | Matsumura ...... G08G 1/096791 |
| | | | 703/2 |

(Continued)

FOREIGN PATENT DOCUMENTS

| JP | 2013-250663 A | 12/2013 |
| JP | 2014-235605 A | 12/2014 |
| JP | 2018-010406 A | 1/2018 |

*Primary Examiner* — Shaghayegh Azima
(74) *Attorney, Agent, or Firm* — Maschoff Brennan

(57) ABSTRACT

A server device includes: a data collection unit that collects vehicle behavior data; a scene extraction unit that extracts, from the collected vehicle behavior data, driving scenes corresponding to the behavior of the vehicle and a scene feature amount of each of the driving scenes; an abnormality detection unit that calculates a degree of abnormality which represents an extent of deviation of the scene feature amount of each of the extracted driving scenes relative to a driving model, and detects a driving scene including a location of an abnormality using the calculated degree of abnormality; a section determination unit that extracts driving scenes satisfying a predetermined condition from among the detected driving scene and a plurality of driving scenes continuous to the driving scene, and determines, as an abnormal behavior section, a time range defined by the total continuation time of the extracted driving scenes; an image request unit that requests, from the vehicle, one or more captured images according to the determined abnormal behavior section; and a display control unit that performs control to display the images acquired from the vehicle according to the request.

16 Claims, 20 Drawing Sheets

(51) Int. Cl.
*G06T 7/00* (2017.01)
*G06V 10/40* (2022.01)

(56) References Cited

U.S. PATENT DOCUMENTS

| | | | |
|---|---|---|---|
| 2019/0278278 A1* | 9/2019 | Yasuda | G05D 1/0088 |
| 2019/0383631 A1* | 12/2019 | Bigio | G06V 20/59 |
| 2020/0241530 A1* | 7/2020 | Caveney | G06N 5/04 |
| 2020/0409385 A1* | 12/2020 | Chakravarty | G06V 10/454 |
| 2021/0323546 A1* | 10/2021 | Svensson | B60W 60/00276 |
| 2021/0323555 A1* | 10/2021 | Sholingar | G06K 9/6257 |

* cited by examiner

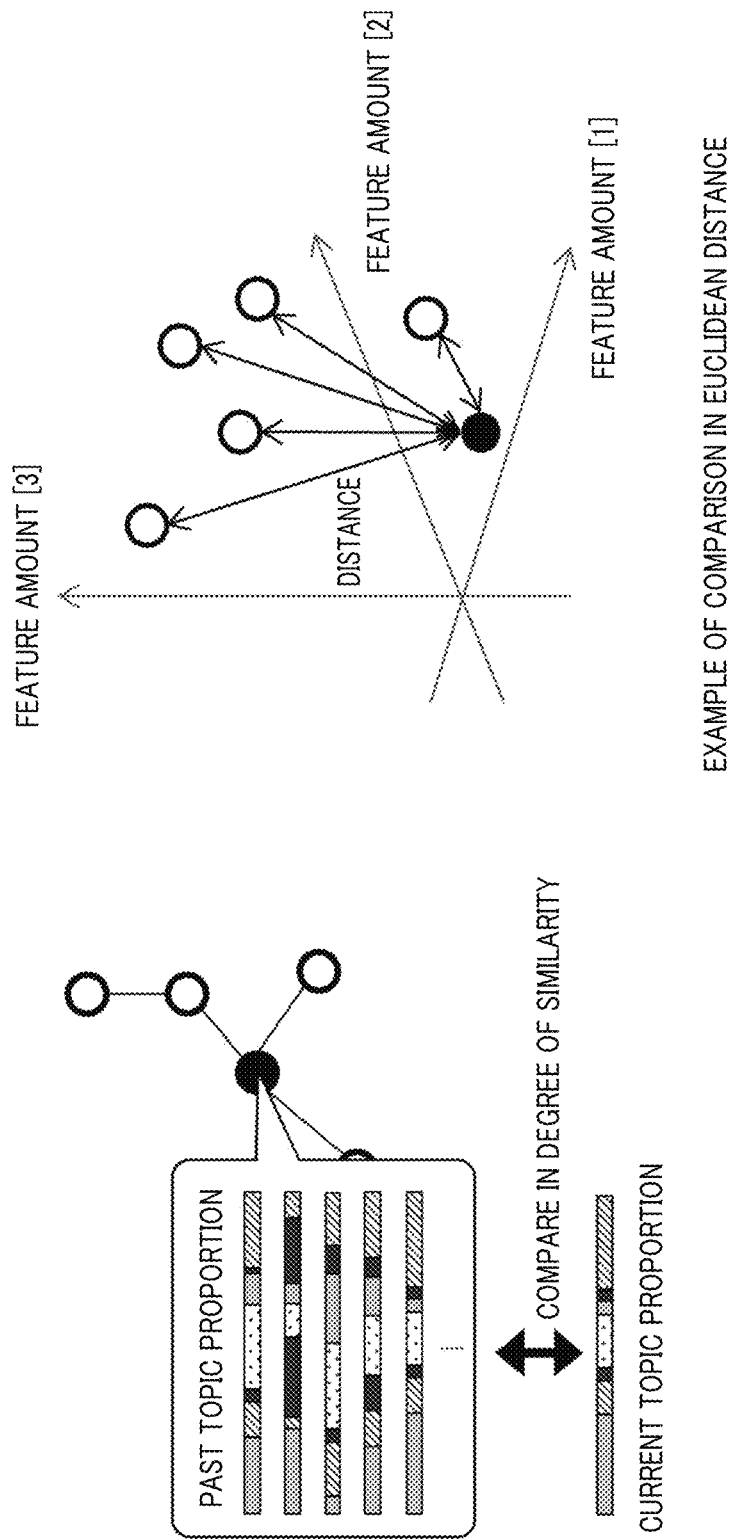

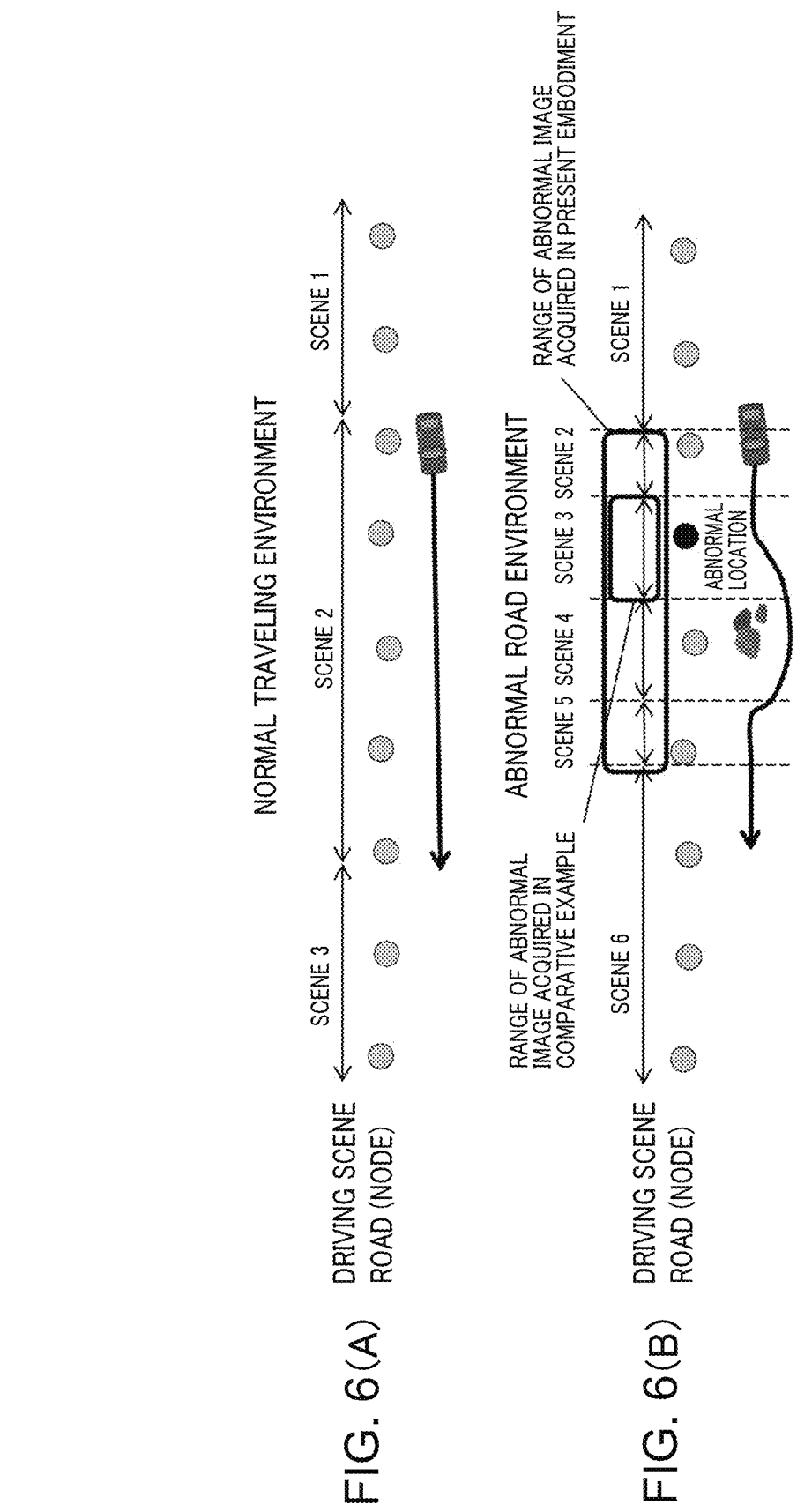

FIG.10
REPRODUCE IMAGE CORRESPONDING TO
DRIVING SCENE DESIGNATED BY USER
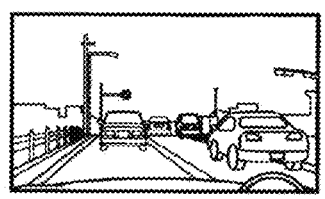
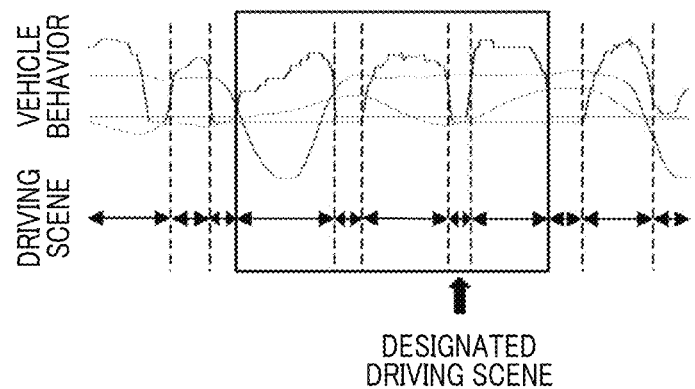
DESIGNATED
DRIVING SCENE FIG.16
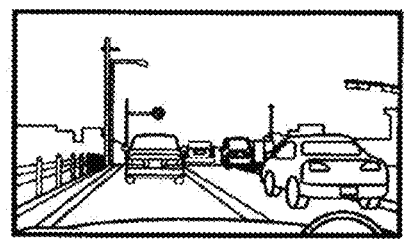
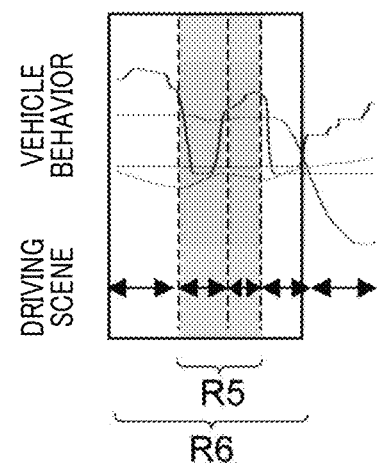

ROAD ENVIRONMENT MONITORING DEVICE, ROAD ENVIRONMENT MONITORING SYSTEM, AND ROAD ENVIRONMENT MONITORING PROGRAM

CROSS-REFERENCE TO RELATED APPLICATION

This application is based on and claims the benefit of priority from earlier Japanese Patent Application No. 2019-123968 filed Jul. 2, 2019, the description of which is incorporated herein by reference.

TECHNICAL FIELD

The present disclosure relates to a road environment monitoring device, a road environment monitoring system, and a road environment monitoring program.

BACKGROUND

Conventionally known is a monitoring system that monitors a road environment using images from an on-board camera, and, when detecting an abnormality, distributes the details of the abnormality via a center device to each vehicle.

For example, JP 2018-10406 A describes a monitoring system that detects an abnormality in a road environment using vehicle behavior data which represents behavior of a vehicle. This monitoring system detects a location of an abnormality in the road environment using the vehicle behavior data and analyze camera images of the detected abnormal location to identify a cause for the abnormality. This monitoring system defines the vehicle behavior having a time-series specific repetitive pattern as a driving scene, and stores this driving scene and positional information in association with each other. When detecting a location of an abnormality, it requests images of the location of the abnormality to the vehicle, and acquires images of the driving scene associated with the location of the abnormality from the vehicle to which the images have been requested.

SUMMARY

A road environment monitoring device according to a first aspect of the present disclosure includes a data collection unit, a scene extraction unit, an abnormality detection unit, a section determination unit, an image request unit, and a display control unit.

The data collection unit collects vehicle behavior data which represents behavior of a vehicle and with which time and position are associated.

The scene extraction unit extracts, from the vehicle behavior data collected by the data collection unit, driving scenes corresponding to the behavior of the vehicle and a scene feature amount of each of the driving scenes.

The abnormality detection unit calculates a degree of abnormality which represents an extent of deviation of the scene feature amount of each of the driving scenes extracted by the scene extraction unit relative to a driving model which represents a characteristic of typical vehicle behavior data, and detects a driving scene including a location of an abnormality using the calculated degree of abnormality.

The section determination unit extracts driving scenes satisfying a predetermined condition from among the driving scene detected by the abnormality detection unit and a plurality of driving scenes continuous to the driving scene, and determines, as an abnormal behavior section, a time range defined by the total continuation time of the extracted driving scenes.

The image request unit requests, from the vehicle, one or more captured images according to the abnormal behavior section determined by the section determination unit.

The display control unit performs control to display the images acquired from the vehicle together with at least one of time, position, and degree of abnormality, according to the request from the images request unit.

BRIEF DESCRIPTION OF THE DRAWINGS

In the accompanying drawings:

FIG. 5 is a view for explaining abnormality detection processing according to the first embodiment;

FIG. 6(A) is a view showing the correlation between driving scenes and nodes in a normal road environment;

FIG. 6(B) is a view showing the correlation between driving scenes and nodes in an abnormal road environment;

FIG. 10 is a view showing the correlation between images and driving scenes within the abnormal behavior section according to the embodiment;

FIG. 16 is a view showing the correlation between images acquired from a vehicle approaching an operator set location and driving scenes according to the embodiment;

DETAILED DESCRIPTION OF THE PREFERRED EMBODIMENTS

Figure 1:
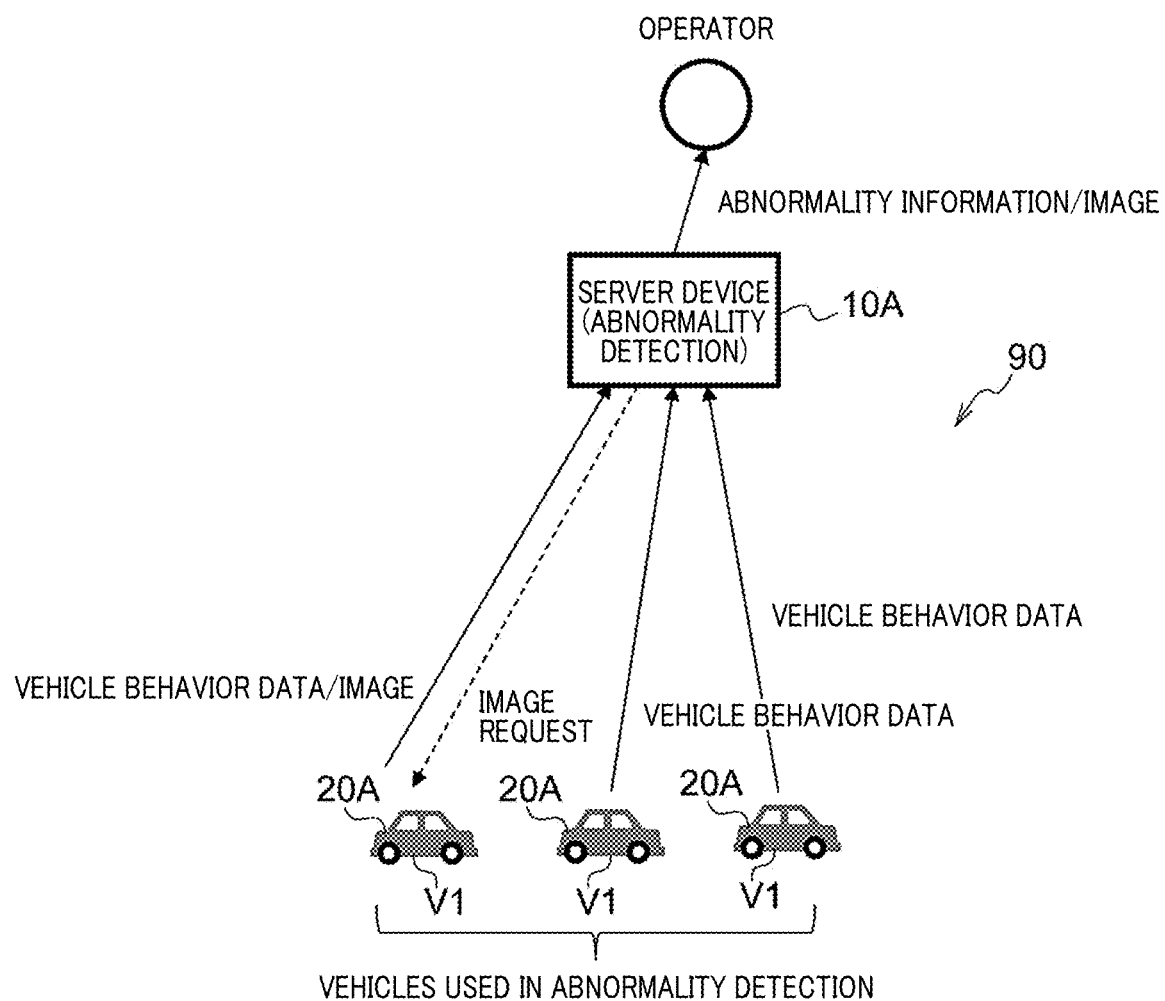
FIG. 1 is a view showing an example of the configuration of a road environment monitoring system according to a first embodiment.

In the technique described in JP 2018-10406 A, the images of one driving scene including the location of the abnormality is captured. However, a driver, when having found an abnormal situation such as an obstacle, mostly takes an avoidance action from a position somewhat before the location where the abnormal situation has occurred. Therefore, the location determined to be abnormal based on the vehicle behavior data which represents the avoidance action is often different from the location where the abnormal situation has occurred. In this case, the images of one driving scene including the location of the abnormality does not ensure a sufficient time, and thus may not contain the abnormal situation.

In addition, JP 2018-10406 A describes that, with the driving scene including the location of the abnormality being used as a reference, images included within a predetermined time (for example, 3 seconds) before and after the driving scene is captured. In this case, however, the images acquired are longer in time than necessary, and may contain surplus images irrelevant to the abnormal situation.

Accordingly, it is desired that the images obtained when an abnormal situation occurs during vehicle traveling contains the abnormal situation within an appropriate time range which is not too short or long.

An object of the present disclosure is to provide a road environment monitoring device, a road environment monitoring system and a road environment monitoring program which can provide images which contains an abnormal situation within an appropriate time range.

A road environment monitoring device according to a first aspect of the present disclosure includes a data collection unit, a scene extraction unit, an abnormality detection unit, a section determination unit, an image request unit, and a display control unit.

The data collection unit collects vehicle behavior data which represents behavior of a vehicle and with which time and position are associated.

The scene extraction unit extracts, from the vehicle behavior data collected by the data collection unit, driving scenes corresponding to the behavior of the vehicle and a scene feature amount of each of the driving scenes.

The abnormality detection unit calculates a degree of abnormality which represents an extent of deviation of the scene feature amount of each of the driving scenes extracted by the scene extraction unit relative to a driving model which represents a characteristic of typical vehicle behavior data, and detects a driving scene including a location of an abnormality using the calculated degree of abnormality.

The section determination unit extracts driving scenes satisfying a predetermined condition from among the driving scene detected by the abnormality detection unit and a plurality of driving scenes continuous to the driving scene, and determines, as an abnormal behavior section, a time range defined by the total continuation time of the extracted driving scenes.

The image request unit requests, from the vehicle, one or more captured images according to the abnormal behavior section determined by the section determination unit.

The display control unit performs control to display the images acquired from the vehicle together with at least one of time, position, and degree of abnormality, according to the request from the image request unit.

A road environment monitoring system according to a second aspect of the present disclosure includes an on-board device mounted in a vehicle, and a road environment monitoring device that conducts a communication with the on-board device.

The on-board device includes a data transmission unit that transmits vehicle behavior data which represents behavior of the own vehicle and with which time and position are associated to the road environment monitoring device.

The road environment monitoring device includes a data collection unit that collects the vehicle behavior data transmitted from the on-board device, a scene extraction unit that extracts, from the vehicle behavior data collected by the data collection unit, driving scenes corresponding to the behavior of the vehicle and a scene feature amount of each of the driving scenes, an abnormality detection unit that calculates a degree of abnormality which represents an extent of deviation of the scene feature amount of each of the driving scenes extracted by the scene extraction unit relative to a driving model which represents a characteristic of typical vehicle behavior data, and detects a driving scene including a location of an abnormality using the calculated degree of abnormality, a section determination unit that extracts driving scenes satisfying a predetermined condition from among the driving scene detected by the abnormality detection unit and a plurality of driving scenes continuous to the driving scene, and determines, as an abnormal behavior section, a time range defined by the total continuation time of the extracted driving scenes, and an image request unit that requests, to the on-board device, images according to the abnormal behavior section determined by the section determination unit.

The on-board device further includes images transmission unit that transmits images corresponding to the abnormal behavior section of the own vehicle to the road environment monitoring device according to the request from the road environment monitoring device.

The road environment monitoring device further includes a display control unit that performs control to display the images acquired from the on-board device together with at least one of time, position, and degree of abnormality.

A road environment monitoring program stored in a nonvolatile, non-transitory computer readable medium according to a third aspect of the present disclosure causes a computer to execute the processing of:

collecting vehicle behavior data which represents behavior of a vehicle and with which time and position are associated, extracting, from the collected vehicle behavior data, driving scenes corresponding to the behavior of the vehicle and a scene feature amount of each of the driving scenes, calculating a degree of abnormality which represents an extent of deviation of the scene feature amount of each of the extracted driving scenes relative to a driving model which represents a characteristic of typical vehicle behavior data, and detecting the driving scene including a location of an abnormality using the calculated degree of abnormality, extracting driving scenes satisfying a predetermined condition from among the detected driving scene and a plurality of driving scenes continuous to the driving scene, and determining, as an abnormal behavior section, a time range defined by the total continuation time of the extracted driving scenes, requesting, from the vehicle, one or more captured images according to the determined abnormal behavior section, and performing control to display the images acquired from the vehicle together with at least one of time, position, and degree of abnormality, according to the request.

The disclosed technique provides the effect of making it possible to obtain images containing an abnormal situation within an appropriate time range.

Hereinafter, examples of forms for carrying out the technique of the present disclosure will be described in detail with reference to the drawings.

First Embodiment

FIG. 1 is a view showing an example of the configuration of a road environment monitoring system 90 according to a first embodiment.

As shown in FIG. 1, the road environment monitoring system 90 according to the present embodiment includes a server device 10A and a plurality of on-board devices 20A. The server device 10A is installed in a cloud as an example, and is an example of road environment monitoring device. Each of the plurality of on-board devices 20A is mounted in a respective one of a plurality of vehicles V1.

As an example, a general-purpose computer device such as a server computer or a personal computer (PC) is employed as the server device 10A. The server device 10A is connected to each of the plurality of on-board devices 20A via wireless communication.

As an example, computer devices which are mountable on vehicles are employed as the on-board devices 20A. Connected to each of the on-board devices 20A are a camera for photographing an environment where the vehicle V1 travels (hereinafter referred to as "road environment") to acquire images, and various sensors for acquiring vehicle behavior data which represents behavior of the vehicle V1, as will be described later. The camera and various sensors are provided integrally with or separately from the on-board device 20A. The on-board device 20A is configured as one unit including the camera and various sensors.

The server device 10A requests images including an abnormal situation to the on-board device 20A of the vehicle V1 in which the abnormal situation has been detected using the vehicle behavior data. That is, the vehicle V1 detecting the abnormal situation and the vehicle V1 to which the images including the abnormal situation is requested are the same. Note that an operator shown in FIG. 1 means an operator in charge of the operations of the server device 10A. The server device 10A displays, to the operator, the images together with abnormality information obtained by analysis of the images including the abnormal situation. As the abnormality information, as an example, a message "Obstacle on the road" is displayed.

Figure 2:
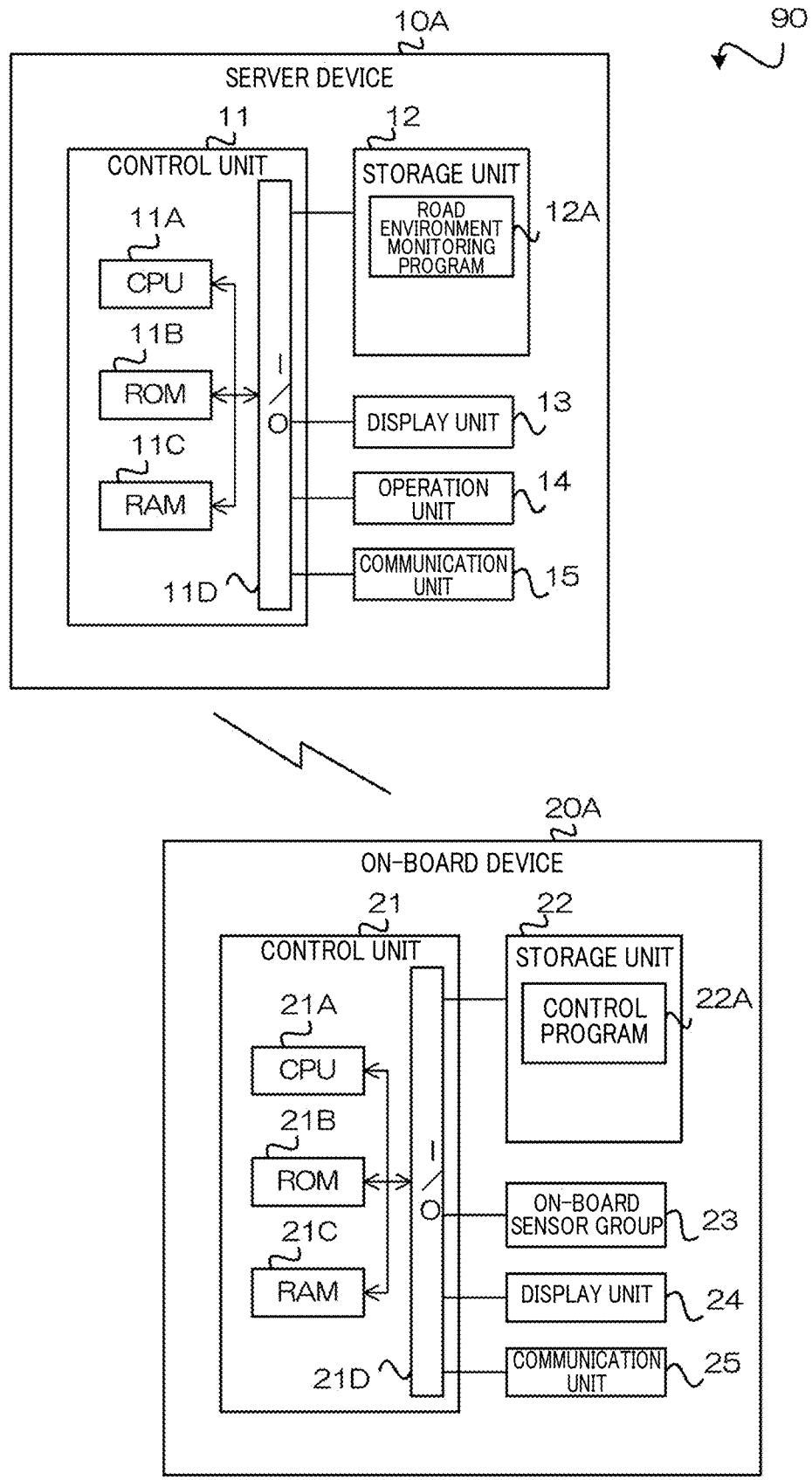
FIG. 2 is a block diagram showing an example of the electrical configurations of a server device and an on-board device according to the first embodiment.

FIG. 2 is a block diagram showing an example of the electrical configurations of the server device 10A and the on-board device 20A according to the first embodiment.

As shown in FIG. 2, the server device 10A according to the present embodiment includes a control unit 11, a storage unit 12, a display unit 13, an operation unit 14 and a communication unit 15.

The control unit 11 includes a CPU (Central Processing Unit) 11A, a ROM (Read Only Memory) 11B, a RAM (Random Access Memory) 11C and an input/output interface (I/O) 11D, and these units are connected to each other via a bus.

To the I/O 11D, function units including the storage unit 12, the display unit 13, the operation unit 14 and the communication unit 15 are each connected. These respective function units are configured to be mutually communicable with the CPU 11A via the I/O 11D.

The control unit 11 may be configured as a sub-control unit that controls some of the operations of the server device 10A or may be configured as a part of a main control unit that controls the overall operations of the server device 10A. For example, integrated circuits such as LSIs (Large Scale Integration) or IC (Integrated Circuit) chipsets are used in some or all of blocks of the control unit 11. An individual circuit may be used in each of the blocks, or an integrated circuit may be used in some or all of the blocks. The blocks may be provided integrally, or some of the blocks may be provided separately. A part of each of the blocks may be provided separately. For integration of the control unit 11, not only an LSI, but also a dedicated circuit or a general-purpose processor may be used.

The storage unit 12 is, for example, an HDD (Hard Disk Drive), an SSD (Solid State Drive), a flash memory or the like. In the storage unit 12, a road environment monitoring program 12A for road environment monitoring according to the present embodiment is stored. This road environment monitoring program 12A may be stored in the ROM 11B.

The road environment monitoring program 12A may be preliminarily installed in the server device 10A, for example. The road environment monitoring program 12A may be realized by being stored in a nonvolatile, non-transitory computer readable medium or distributed via a network and appropriately installed in the server device 10A. Examples of the nonvolatile, non-transitory recording medium include CD-ROMs (Compact Disc Read Only Memories), magneto-optical disks, HDDs, DVD-ROMs (Digital Versatile Disc Read Only Memories), flash memories, and memory cards.

The display unit 13 is, for example, a liquid crystal display (LCD) or an organic EL (Electro Luminescence) display. The display unit 13 may have a touch panel integrally. The operation unit 14 is provided with a device for operation input such as a keyboard or a mouse. The display unit 13 and the operation unit 14 accept various instructions from the operator of the server device 10A. The display unit 13 displays results of processing executed according to the instructions accepted from the operator and various information such as notification to the processing.

The communication unit 15 is a communication interface for conducting wireless communication with each of the plurality of on-board devices 20A.

On the other hand, as shown in FIG. 2, the on-board devices 20A according to the present embodiment each include a control unit 21, a storage unit 22, an on-board sensor group 23, a display unit 24 and a communication unit 25.

The control unit 21 includes a CPU 21A, a ROM 21B, a RAM 21C and an I/O 21D, and these units are connected to each other via a bus.

To the I/O 21D, function units including the storage unit 22, the on-board sensor group 23, the display unit 24 and the communication unit 25 are connected. These respective function units are configured to be mutually communicable with the CPU 21A via the I/O 21D.

The storage unit 22 is, for example, an HDD, an SSD, a flash memory or the like. The storage unit 22 has stored therein a control program 22A which operates in cooperation with the server device 10A. This control program 22A may be stored in the ROM 21B.

The control program 22A may be preliminarily installed in the on-board device 20A, for example. The control program 22A may be realized by being stored in a nonvolatile, non-transitory recording medium or distributed via a network and appropriately installed in the on-board device 20A.

As an example, the on-board sensor group 23 includes a camera and various sensors which are mounted in the own vehicle. The camera photographs a road environment of the own vehicle and acquires images (for example, moving images). The various sensors acquire vehicle behavior data which represents the behavior of the own vehicle and contents of the driving operation to the own vehicle. As an example, the vehicle behavior data includes an accelerator opening, a brake pressure, a steering angle, a vehicle speed, an acceleration, and a yaw rate. The on-board sensor group 23 may include a GPS (Global Positioning System) receiver, a car navigation device, and the like which are mounted in the own vehicle.

The GPS receiver and car navigation device acquire information including a current position and a traveling direction of the own vehicle and a current time.

The display unit 24 is, for example, a liquid crystal display (LCD) or an organic EL display. The display unit 24 may have a touch panel integrally. The display unit 24 may be configured as a display or head-up display of the car navigation device.

The communication unit 25 is a communication interface for conducting wireless communication with the server device 10A.

It is desired that the images obtained when an abnormal situation occurs during vehicle traveling contains the abnormal situation within an appropriate time range which is not too short or long, as described above.

Figure 3:
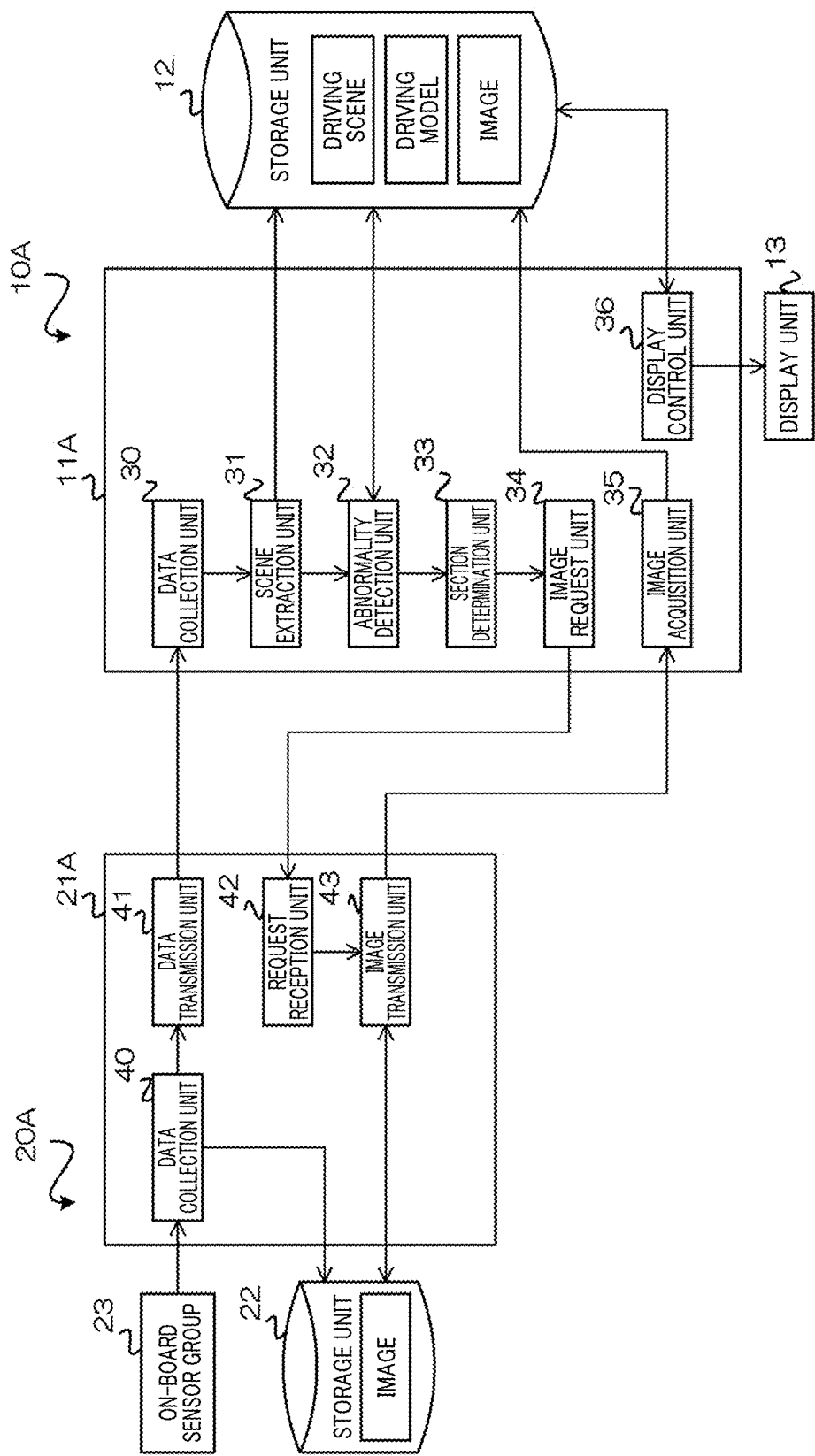
FIG. 3 is a block diagram showing an example of the functional configurations of the server device and the on-board device according to the first embodiment.

Therefore, the CPU 11A of the server device 10A according to the present embodiment copies the road environment monitoring program 12A from the storage unit 12 to the RAM 11C for execution thereof, and thus functions as the respective units shown in FIG. 3. The CPU 21A of the on-board device 20A according to the present embodiment writes the control program 22A stored in the storage unit 22 in the RAM 21C for execution thereof, and thus functions as the respective units shown in FIG. 3.

FIG. 3 is a block diagram showing an example of the functional configurations of the server device 10A and the on-board device 20A according to the first embodiment.

As shown in FIG. 3, the CPU 11A of the server device 10A according to the present embodiment functions as a data collection unit 30, a scene extraction unit 31, an abnormality detection unit 32, a section determination unit 33, an image request unit 34, an image acquisition unit 35 and a display control unit 36. Also, the CPU 21A of the on-board device 20A according to the present embodiment functions as a data collection unit 40, a data transmission unit 41, a request reception unit 42 and an image transmission unit 43.

Now, the functional configuration of the on-board device 20A will be described.

The data collection unit 40 repeatedly collects the above-described vehicle behavior data images, positional information, time information, and the like from the on-board sensor group 23 in a predetermined cycle. The data collection unit 40 associates the time and the position with the collected vehicle behavior data. The data collection unit 40 stores the collected time-series images in the storage unit 22.

The data transmission unit 41 transmits the vehicle behavior data with which the time and the position are associated by the data collection unit 40 to the server device 10A.

The request reception unit 42 receives a request for transmission of images according to an abnormal behavior section which will be described later from the server device 10A.

The image transmission unit 43 retrieves the images according to the abnormal behavior section from the storage unit 22 according to the transmission request received via the request reception unit 42, and transmits the retrieved images to the server device 10A.

Next, the functional configuration of the server device 10A will be described.

The data collection unit 30 collects the vehicle behavior data with which the time and the position are associated from the on-board device 20A of the vehicle V1.

The scene extraction unit 31 extracts driving scenes according to the behavior of the vehicle V1 and a scene feature amount of each of the driving scenes from the vehicle behavior data collected by the data collection unit 30. The extracted driving scenes and scene feature amount of each of the driving scenes are stored in the storage unit 12.

Figure 4:
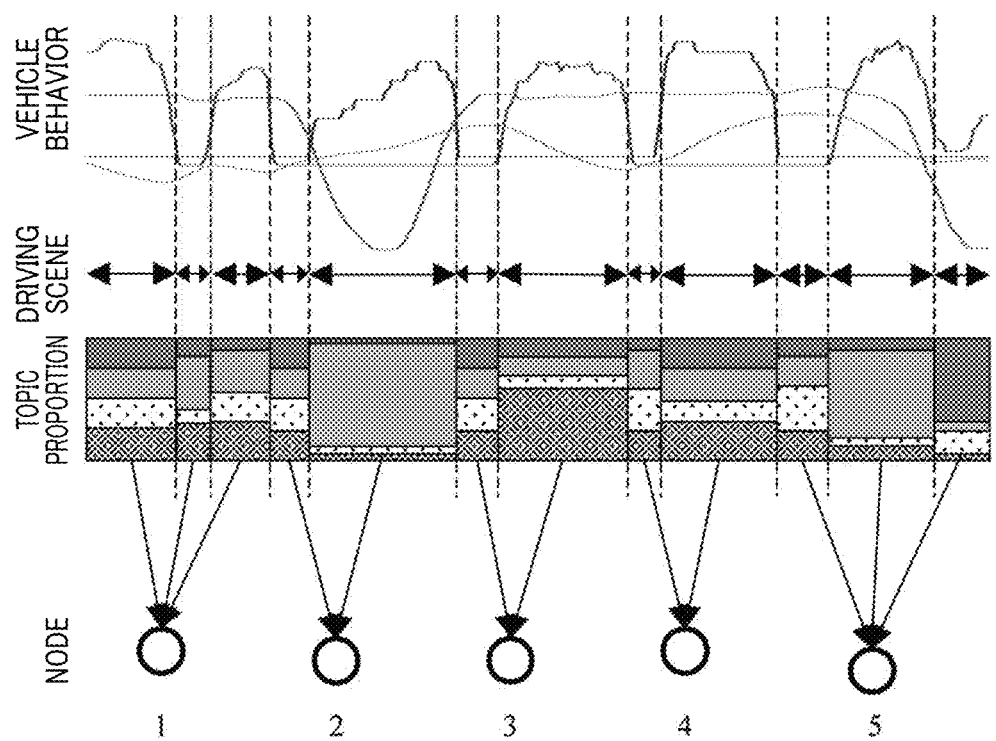
FIG. 4 is a view for explaining extraction processing of driving scenes and scene feature amounts according to the first embodiment.

FIG. 4 is a view for explaining extraction processing of driving scenes and scene feature amounts according to the present embodiment.

As shown in FIG. 4, for example, a time-series pattern extraction technique typified by the Hidden Markov Model (HMM) is used to extract typical repetitive driving patterns as driving scenes from the vehicle behavior data. A series of scene IDs (identifications) are given to the extracted driving scenes. The extraction technique of driving scene is not limited to the Hidden Markov Model, and, for example, the known symbolization technique described in JP 2013-250663 A may be used. The driving scenes may be extracted according to a predetermined rule, for example, that the driving scenes during stop of the vehicle are regarded as one driving scene. As characteristics of the driving scenes, driving with a small change (for example, straight-ahead driving) leads to a long continuation time of a driving scene, whereas driving so as to avoid an obstacle or the like has a great change, leading to a short continuation time of a driving scene. After extraction of the driving scenes, the driving scenes are stored in association with positions. The "position" referred to herein is expressed as a node, but may be expressed, for example, with a link or a grid preliminarily divided by a specific distance. To each driving scene, an index which can identify driving scenes before and after the driving scene is given.

The scene feature amount extracted for each driving scene is also stored in association with the position. The "scene feature amount" referred to herein is indicated as a feature vector representing a characteristic of the driving scene. As an example, a topic proportion extracted using Latent Dirichlet Allocation (LDA) is used as this scene feature amount. This topic proportion means a mixing ratio obtained when a plurality of driving topics representing characteristic patterns of driving scenes are prepared in advance and a driving scene of interest is expressed by mixing of driving topics. This topic proportion is the known technique described in JP 2014-235605 A or the like, and thus is not specifically described here. This scene feature amount is not limited to the topic proportion. For example, an average value of the respective behaviors included in the respective driving scenes may be used.

The abnormality detection unit 32 calculates a degree of abnormality which represents an extent of deviation of the scene feature amount of each of the driving scenes extracted by the scene extraction unit 31 relative to a driving model which represents a characteristic of typical vehicle behavior data, and detects a driving scene including a location of an abnormality using the calculated degree of abnormality. Specifically, it preliminarily learns a typical driving model at each place and determines, based on the extent of deviation of the scene feature amount for each place, whether abnormal driving has been performed at that place. The driving model is stored in the storage unit 12 in advance. The "driving model" is a collection of standard scene feature amounts detected in each traveling section, and is prepared by statistical processing of past vehicle behavior data. The "traveling section" is a section set by dividing a road on which the vehicle can travel. For example, the driving model may be composed of a plurality of models which are different depending on the weather or time.

FIG. 5 is a view for explaining abnormality detection processing according to the present embodiment.

As shown in FIG. 5, in the abnormality detection processing, the degree of abnormality which represents an extent of deviation of a current topic proportion from the past topic proportion (corresponding to the driving model) at the same location is calculated by distance calculation (for example, utilizing the Euclidean distance), with the topic proportion extracted from the vehicle behavior by the scene extraction unit 31 being used as the scene feature amount. For the current topic proportion, the degrees of abnormality calculated by distance calculation every fixed time (for example, the processing is performed on data for the last 5 minutes every 1 minute) are determined based on a threshold value. When the degree of abnormality is larger than the threshold value, i.e., the distance is longer than a fixed distance and deviates, the topic proportion is determined as abnormal driving, and the determination result is accumulated. All the current topic proportions included in the fixed time are processed, and then, when the frequency of abnormal driving is beyond a predetermined threshold value, the location is determined to be abnormal. The abnormality detection processing is not limited to this, and a distribution of current traveling data at each location and a distribution of the preliminarily accumulated driving data may be compared, for example, using the KL (Kullback-Leibler) divergence, the GMM (Gaussian Mixture Model) or the like.

The section determination unit 33 extracts driving scenes satisfying a predetermined condition from among the driving scenes detected by the abnormality detection unit 32 and a plurality of driving scenes continuous to the driving scene, and determines a time range defined by the total continuation time of the extracted driving scenes as the abnormal behavior section. A specific method of determining this abnormal behavior section will be described later. The section determination unit 33 extracts driving scenes whose continuation time is less than a threshold value as the driving scenes satisfying the predetermined condition. As an example, this threshold value is an average value of the continuation times of the plurality of driving scenes included in the vehicle behavior data. This threshold value may be a value obtained by multiplying the continuation time of the driving scene including the location of the abnormality by a predetermined coefficient (for example, a range of 1.1 to 1.9).

The driving scenes whose continuation time is less than the threshold value are extracted in the above description, but the present invention is not limited to this. The section determination unit 33 may extract, from the vehicle behavior data, remaining driving scenes other than driving scenes whose appearance frequency is equal to or more than a threshold value as the driving scenes satisfying the predetermined condition. That is, driving scenes having a long continuation time repeatedly appear during normal traveling. Therefore, from the vehicle behavior data, the driving scenes during normal traveling, i.e., remaining driving scenes other than driving scenes whose appearance frequency is equal to or more than the threshold value, can be regarded as driving scenes during abnormal traveling.

In addition, a reference continuation time which represents a continuation time as a reference for the driving scenes at each location may be preliminarily included in the driving model described above. As this reference continuation time, the continuation time serving as the reference is preliminarily set for each location based on the continuation time of the driving scene during normal traveling. In this case, the section determination unit 33 extracts driving scenes in which a difference between the continuation time of the driving scenes at each location and the reference continuation time is equal to or more than a threshold value as the driving scenes satisfying the predetermined condition. That is, the difference between the continuation time of the driving scene at each location and the reference continuation time is small, i.e., less than the threshold value during normal traveling. So, the driving scenes during abnormal traveling can be extracted.

The image request unit 34 requests the images according to the abnormal behavior section determined by the section determination unit 33 to the on-board device 20A of the vehicle V1. For example, it requests the images to the same vehicle V1 as the vehicle V1 used in abnormality detection.

As shown in FIG. 1, when the vehicle behavior data is collected from each of the plurality of vehicles V1 to determine the abnormal behavior section for each of the plurality of vehicles V1, the image request unit 34 may determine the vehicle to which the images are requested, preferentially from the vehicle having the longest abnormal behavior section, among the plurality of vehicles V1. Thus, the images having the highest possibility that the abnormal situation may be contained therein is obtained.

The image acquisition unit 35 acquires the images according to the abnormal behavior section from the on-board device 20A of the vehicle V1. The acquired images are stored in the storage unit 12.

The display control unit 36 performs control to display the images acquired from the on-board device 20A of the vehicle V1 together with at least one of time, position, and degree of abnormality according to the request from the image request unit 34. The images acquired from the on-board device 20A are displayed, as an example, on the display unit 13 of the own device or the display unit 24 of the on-board device 20A.

FIG. 6(A) is a view showing the correlation between driving scenes and nodes in a normal road environment. FIG. 6(B) is a view showing the correlation between driving scenes and nodes in an abnormal road environment.

In the normal road environment shown in FIG. 6(A), the behavior of the vehicle is expressed by a collection of typical driving scenes having a relatively long continuation time.

In the abnormal road environment shown in FIG. 6(B), the behavior of the vehicle in the abnormal behavior section is expressed by a collection of driving scenes having a relatively short continuation time. As shown in FIG. 6(B), Scenes 2 to 5 are included in the abnormal behavior section in the present embodiment. Accordingly, images within the range of Scene 3 including the location of the abnormality and Scenes 2, 4 and 5 continuous to Scene 3 are acquired as abnormal images. On the other hand, in a comparative example, only an image of Scene 3 including the location of the abnormality is acquired as an abnormal image. However, when the location of the abnormality determined from the vehicle behavior and the actual abnormal location where the abnormal situation has occurred are different from each other, there is a possibility that the abnormal situation may not be contained in the image of Scene 3, as described above.

Figures 7A, 7B:
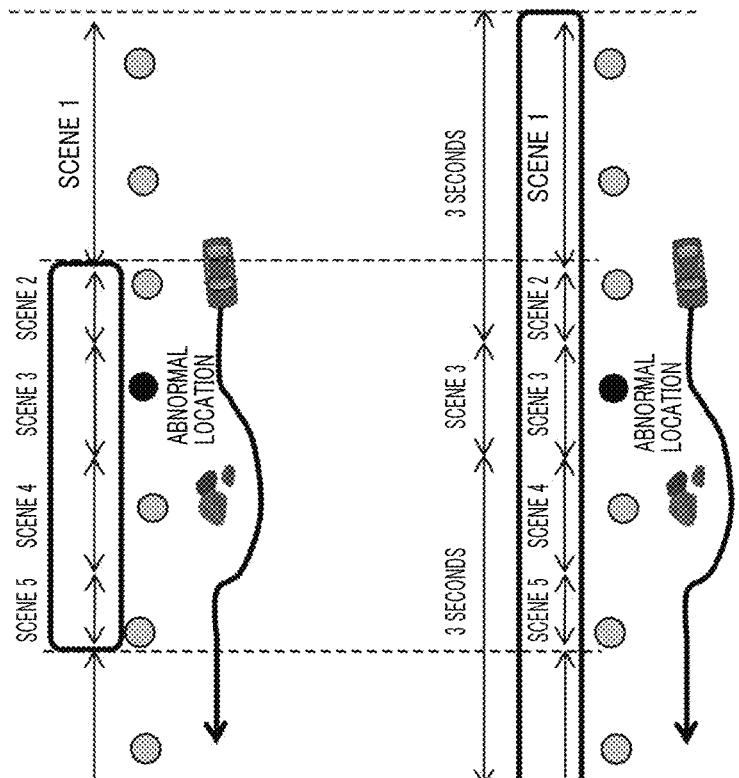
FIG. 7(A) is a view showing the correlation between driving scenes and nodes in an abnormal road environment.
FIG. 7(B) is a view showing a comparative example of the correlation between driving scenes and nodes in an abnormal road environment.

FIG. 7(A) is a view showing the correlation between driving scenes and nodes in an abnormal road environment. FIG. 7(B) is a view showing a comparative example of the correlation between driving scenes and nodes in an abnormal road environment.

In the abnormal road environment shown in FIG. 7(A), Scenes 2 to 5 are included in the abnormal behavior section, as in the example shown in FIG. 6(B). Accordingly, images within the range of Scene 3 including the location of the abnormality and Scenes 2, 4 and 5 continuous to Scene 3 are acquired as abnormal images. On the other hand, in the comparative example shown in FIG. 7(B), with Scene 3 including the location of the abnormality being used as a reference, images included within a predetermined time (3 seconds, herein) before and after Scene 3 are acquired. In this case, however, the images acquired are longer in time than necessary, and extra footage unrelated to the abnormal situation is acquired.

In contrast to the comparative example, the images of the abnormal behavior section including Scene 3 and Scenes 2, 4 and 5 continuous to Scene 3 are acquired, and thus an appropriate images containing the abnormal situation are obtained, in the present embodiment.

Next, the action of the server device 10A according to the first embodiment will be described with reference to FIG. 8.

Figure 8:
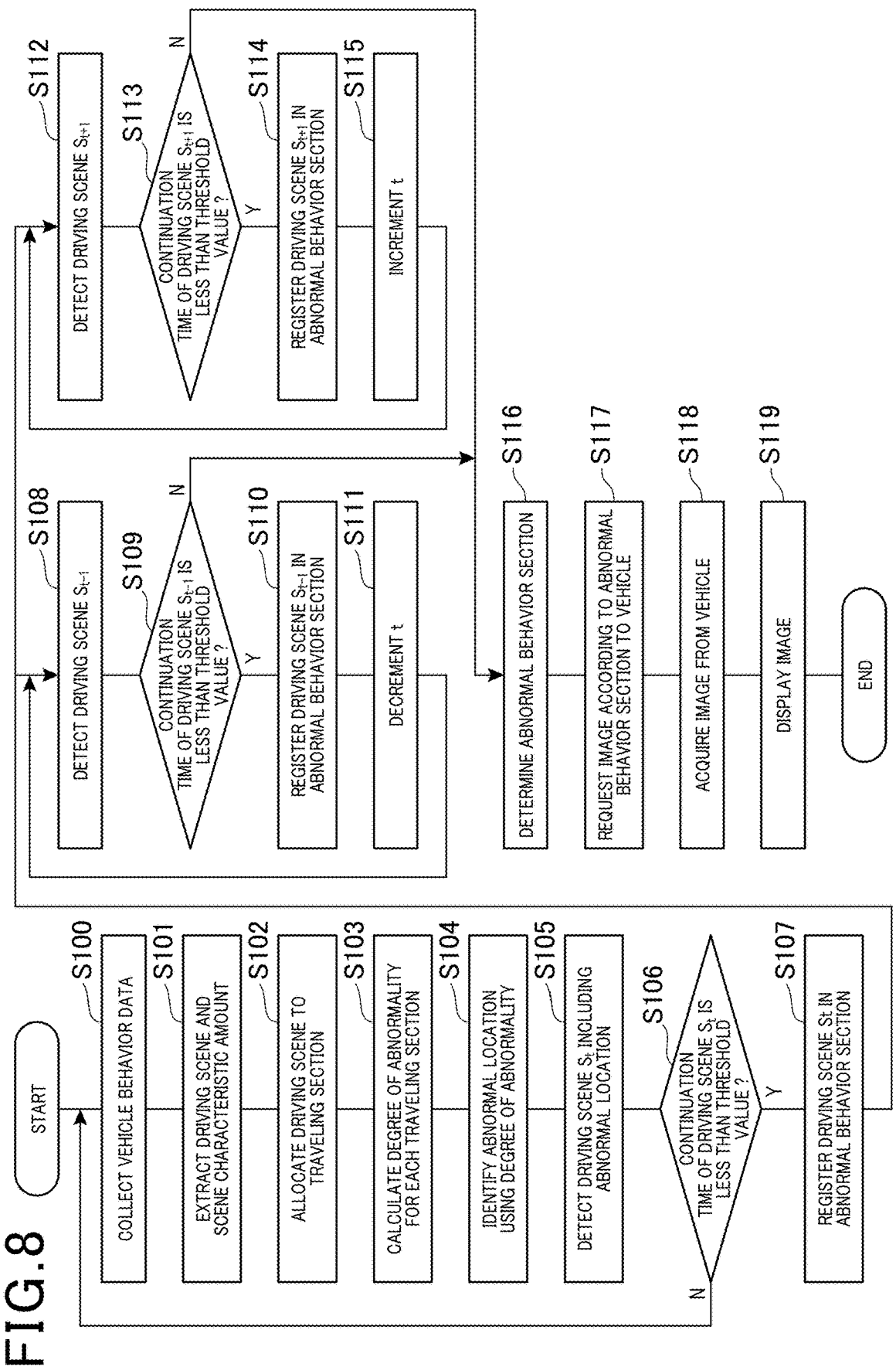
FIG. 8 is a flowchart showing an example of a flow of processing by a road environment monitoring program according to the first embodiment.

FIG. 8 is a flowchart showing an example of a flow of the processing by the road environment monitoring program 12A according to the first embodiment.

Firstly, when the execution of road environment monitoring processing is instructed to the server device 10A, the road environment monitoring program 12A is activated to execute the following steps.

In step 100 shown in FIG. 8, as the data collection unit 30, the CPU 11A collects vehicle behavior data which represents behavior of the vehicle V1 from the on-board device 20A of the vehicle V1.

In step 101, as the scene extraction unit 31, the CPU 11A extracts driving scenes according to the behavior of the vehicle V1 and a scene feature amount of each of the driving scenes from the vehicle behavior data collected in step 100, as an example, in a manner as explained with reference to FIG. 4 above.

In step 102, as the abnormality detection unit 32, the CPU 11A allocates the driving scenes extracted in step 101 to traveling sections. The "traveling sections" referred to herein correspond to the traveling sections of the driving model preliminarily stored in the storage unit 12.

In step 103, as the abnormality detection unit 32, the CPU 11A calculates a degree of deviation of the scene feature amount of each of the driving scenes to the driving model preliminarily stored in the storage unit 12, as an example, as explained with reference to FIG. 5 above, for each of the traveling sections allocated in step 102.

In step 104, as the abnormality detection unit 32, the CPU 11A identifies a location of an abnormality, as an example, as explained with reference to FIG. 5 above, using the degree of abnormality calculated in step 103.

Figure 9:
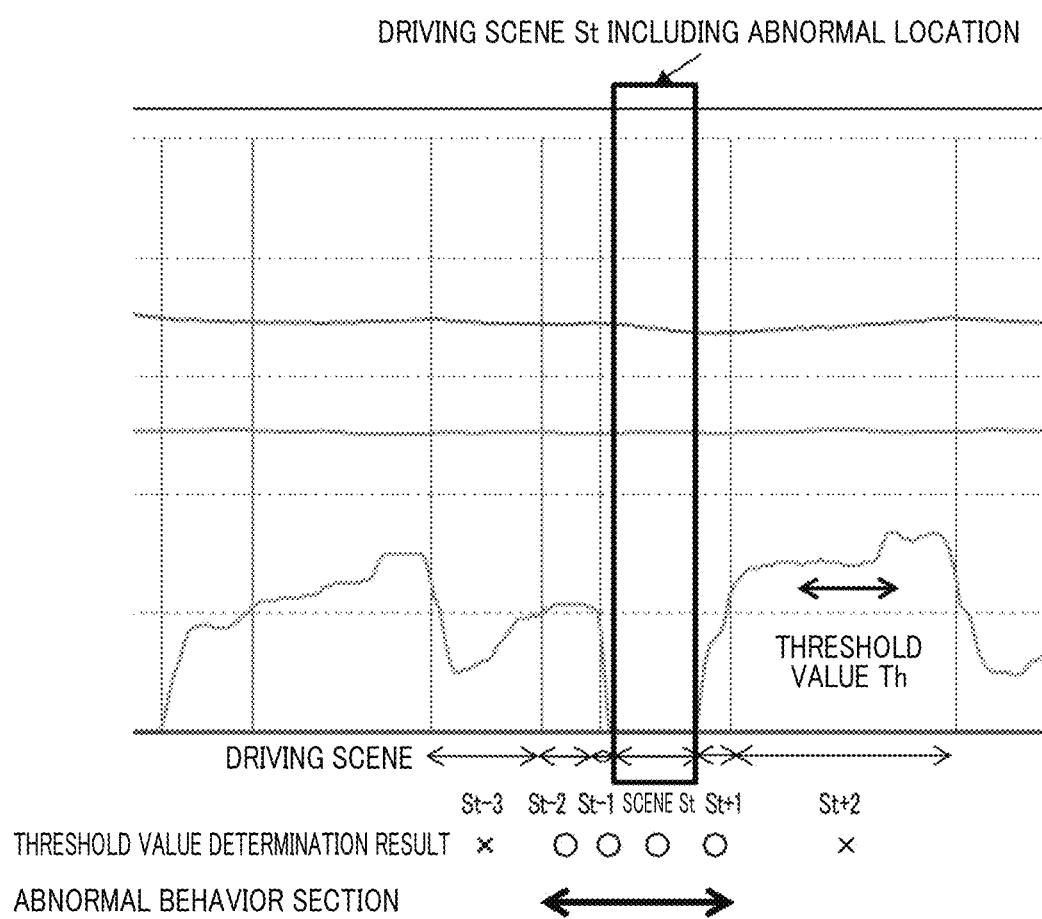
FIG. 9 is a view for explaining abnormal behavior section determination processing according to the embodiment.

In step 105, as the abnormality detection unit 32, the CPU 11A detects a driving scene St including the location of the abnormality identified in step 104, as an example, as shown FIG. 9. Note that FIG. 9 is a view for explaining abnormal behavior section determination processing according to the present embodiment.

In step 106, as the section determination unit 33, the CPU 11A determines whether the continuation time of the driving scene $S_t$ detected in step 105 is less than a threshold value Th, as an example, as shown FIG. 9. The "threshold value Th" referred to herein is an average value of the continuation times of the plurality of driving scenes included in the vehicle behavior data, as an example, as described above. When it is determined that the continuation time of the driving scene St is less than the threshold value Th (affirmative determination), the step shifts to step 107. When it is determined that the continuation time of the driving scene St is equal to or more than the threshold value Th (negative determination), the step returns to step 100 to repeat the processing.

In step 107, as the section determination unit 33, the CPU 11A registers the driving scene St in the abnormal behavior section, as an example, as shown in FIG. 9.

In step 108, as the section determination unit 33, the CPU 11A detects a driving scene St−1 which is temporally immediately before the driving scene St, as an example, as shown in FIG. 9.

In step 109, as the section determination unit 33, the CPU 11A determines whether the continuation time of the driving scene St−1 detected in step 108 is less than the threshold value Th, as an example, as shown FIG. 9. When it is determined that the continuation time of the driving scene St−1 is less than the threshold value Th (affirmative determination), the step shifts to step 110. When it is determined that the continuation time of the driving scene St−1 is equal to or more than the threshold value Th (negative determination), the step shifts to step 116.

In step 110, as the section determination unit 33, the CPU 11A registers the driving scene St−1 in the abnormal behavior section, as an example, as shown in FIG. 9.

In step 111, as the section determination unit 33, the CPU 11A decrements t, as an example, as shown in FIG. 9, and the step returns to step 108 to repeat the processing.

On the other hand, in step 112, as the section determination unit 33, the CPU 11A detects a driving scene St+1 which is temporally immediately after the driving scene St, as an example, as shown in FIG. 9.

In step 113, as the section determination unit 33, the CPU 11A determines whether the continuation time of Driving Scene $S_{t+1}$ detected in step 112 is less than the threshold value Th, as an example, as shown FIG. 9. When it is determined that the continuation time of the driving scene $S_{t+1}$ is less than the threshold value Th (affirmative determination), the step shifts to step 114. When it is determined that the continuation time of the driving scene St+1 is equal to or more than the threshold value Th (negative determination), the step shifts to step 116.

In step 114, as the section determination unit 33, the CPU 11A registers the driving scene St+1 in the abnormal behavior section, as an example, as shown in FIG. 9.

In step 115, as the section determination unit 33, the CPU 11A increments t, as an example, as shown in FIG. 9, and the step returns to step 112 to repeat the processing. Note that the processing in steps 112 to 115 may be executed simultaneously and in parallel with the processing in steps 108 to 111, or the processing in steps 108 to 115 may be executed sequentially.

In step 116, as the section determination unit 33, the CPU 11A determines the abnormal behavior section, as an example, as shown in FIG. 9.

That is, in step 106, it is determined whether the continuation time of the driving scene St including the location of the abnormality determined to cause abnormal traveling is less than the threshold value Th. In steps 108 to 115, when the continuation time of the driving scene St is less than the threshold value Th, the driving scenes before and after the time step are detected, starting from the driving scene St. At this time, when the continuation times of the previous and following driving scenes are less than the threshold value Th, driving scenes further one-step traced back from the detected previous and following driving scenes are detected, and the same processing is repeated until driving scenes whose continuation time is equal to or more than the threshold value Th appear. In step 116, a collection of the driving scenes extracted by the processing is determined as the abnormal behavior section.

In step 117, as the image request unit 34, the CPU 11A requests the images according to the abnormal behavior section determined in step 116 to the on-board device 20A of the vehicle V1. In the present embodiment, as an example, it requests the images to the same vehicle V1 as the vehicle V1 used in abnormality detection.

In step 118, as the image acquisition unit 35, the CPU 11A acquires the images according to the abnormal behavior section from the on-board device 20A of the vehicle V1 and stores the acquired images in the storage unit 12.

In step 119, as the display control unit 36, the CPU 11A performs control to display the images acquired from the on-board device 20A of the vehicle V1 together with at least one of time, position, and degree of abnormality on the display unit 13 according to the request in step 117. As an example, it is desirable to request the images preferentially to the vehicle having the longest time length of the abnormal behavior section as described above. Therefore, as long images as possible, among the images of abnormal driving, can be acquired, and thus the possibility that the abnormal situation may be contained therein can be increased.

As another example, the image request may be issued only to a plurality of vehicles having high priority (for example, top three vehicles). Alternatively, the image request may be issued to all the vehicles in which the abnormal behavior section has been identified. In this case, priorities may be set to the vehicles to select the images to be displayed according to the priorities of the vehicles.

In step 119, as the display control unit 36, the CPU 11A terminates the series of processing by the road environment monitoring program 12A, for example, when accepting an instruction for termination by the operator.

Next, a specific example of image display control by the display control unit 36 will be described with reference to FIGS. 10 to 12.

FIG. 10 is a view showing the correlation between images and driving scenes within the abnormal behavior section according to the present embodiment.

The example shown in FIG. 10 indicates the case where the images corresponding to the driving scene designated by a user (for example, operator) are reproduced. In this case, the display control unit 36 associates the images acquired from the on-board device 20A of the vehicle V1 and the driving scenes with each other based on the time and the position, and performs control to display the images corresponding to the designated driving scene on the display unit 13. That is, as regards the images acquired from the on-board device 20A, the operator can designate the desired driving scene in the abnormal behavior section and reproduce the images from the designated driving scene.

Figure 11:
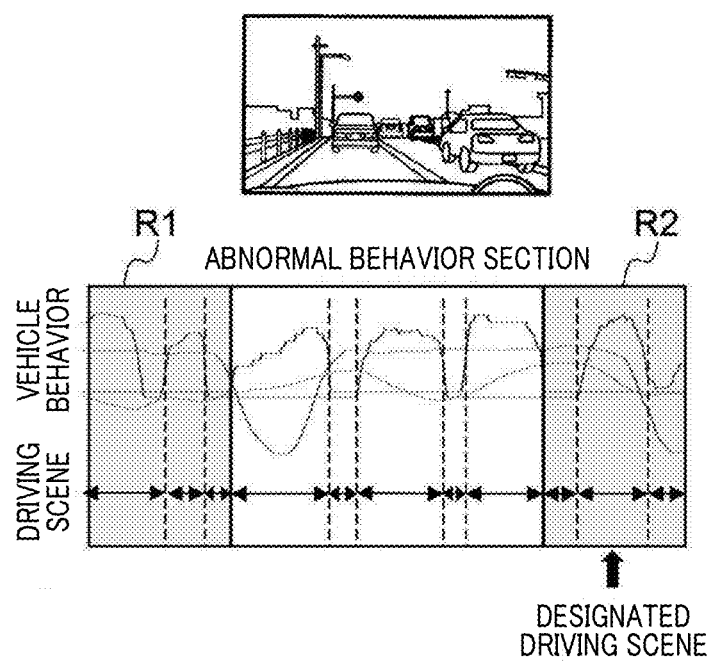
FIG. 11 is a view showing the correlation between images and driving scenes outside the abnormal behavior section according to the embodiment.

FIG. 11 is a view showing the correlation between images and driving scenes outside the abnormal behavior section according to the present embodiment.

The example shown in FIG. 11 indicates the case where the user (for example, operator) acquires and reproduces images corresponding to driving scenes not included in the abnormal behavior section. In this case, the display control unit 36 performs control to display the driving scenes corresponding to the abnormal behavior section and at least one of the driving scenes before and after the abnormal behavior section on the display unit 13 in a designatable manner. In the example shown in FIG. 11, out of a section R1 positioned temporally before the abnormal behavior section and a section R2 positioned temporally after the abnormal behavior section, the driving scene included in the section R2 is designated. However, since neither of these sections R1 and R2 is included in the abnormal behavior section, no image has been acquired from the on-board device 20A of the vehicle V1. Therefore, when the at least one of the driving scenes before and after the abnormal behavior section is designated, the image request unit 34 requests the images corresponding to the at least one of the driving scenes before and after the abnormal behavior section to the on-board device 20A of the vehicle V1 which has acquired the images corresponding to the abnormal behavior section. That is, also for the images of sections not included in the abnormal behavior section, the operator can designate the corresponding driving scenes, and thus newly acquire and reproduce the images of the section involved.

Figure 12:
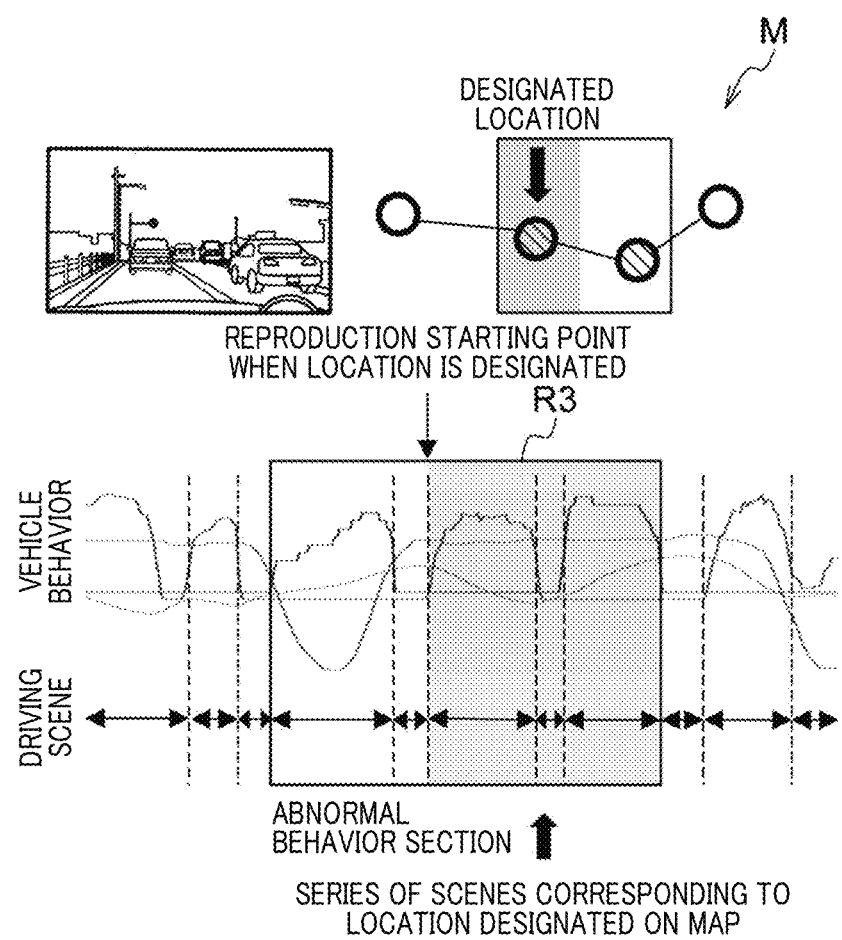
FIG. 12 is a view showing the correlation among the images, a map and the driving scenes within the abnormal behavior section according to the embodiment.

FIG. 12 is a view showing the correlation among the images, a map and the driving scenes within the abnormal behavior section according to the present embodiment.

The example shown in FIG. 12 indicates the case where the images corresponding to the driving scenes associated with the location designated by the user (for example, operator) on the map are reproduced. In this case, the display control unit 36 performs control to display the map including the location corresponding to the abnormal behavior section and to display the images corresponding to the driving scene associated with the location based on the location designated on the map. In the example shown in FIG. 12, the map M containing the location corresponding to the abnormal behavior section (abnormal behavior occurrence location) is displayed together with the driving scenes included in the abnormal behavior section. When the operator designates a desired location on the map M, images are reproduced from the driving scene corresponding to the designated location. Note that, in the example shown in FIG. 12, the images are reproduced from a reproduction starting point in a section R3 in the abnormal behavior section, in correspondence with the designated location on the map M.

Thus, the present embodiment suppresses a phenomenon that, because of too short a time length of the image, the abnormal situation is not contained in the image or that, because of too long a time length of the image, surplus images is included therein, whereby the images in which the abnormal situation is contained in an appropriate time range are obtained. Therefore, the operator or the like can appropriately judge the occurrence of an abnormality.

Second Embodiment

In the first embodiment, the form in which the images are requested to the vehicle used in abnormality detection has been illustrated. In the present embodiment, a form in which a vehicle used in abnormality detection and a vehicle to which images are requested are different from each other will be described.

Figure 13:
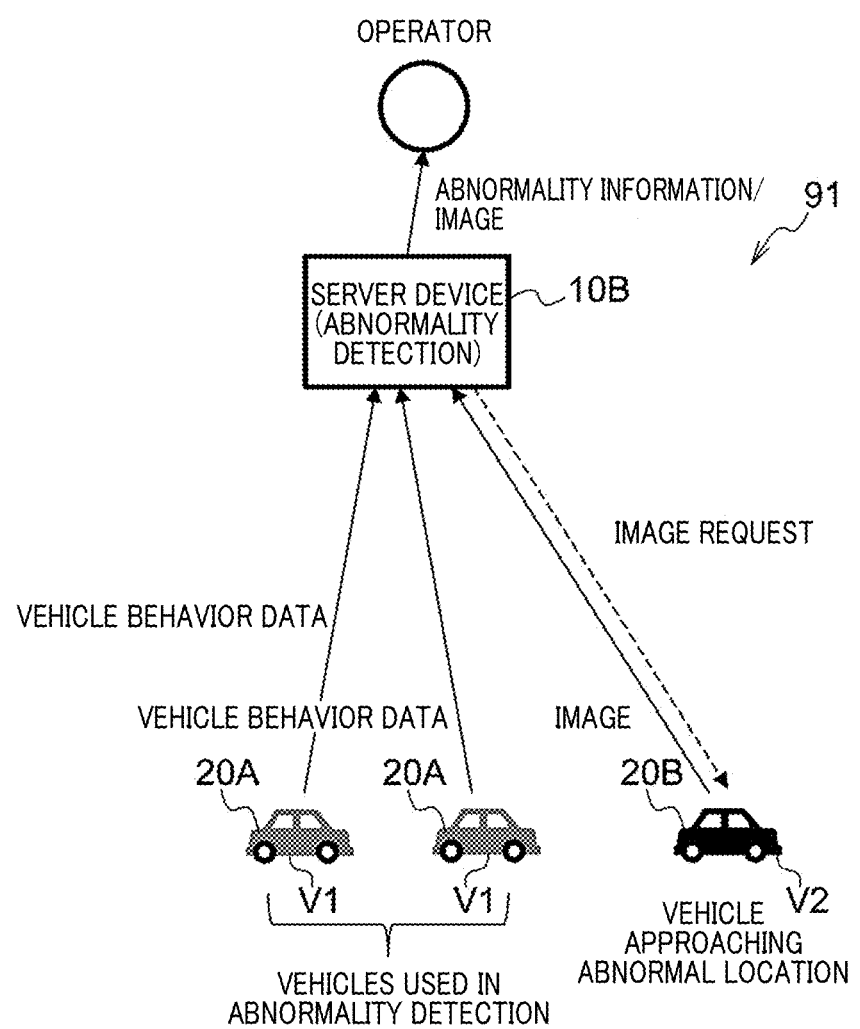
FIG. 13 is a view showing an example of the configuration of a road environment monitoring system according to a second embodiment.

FIG. 13 is a view showing an example of the configuration of a road environment monitoring system 91 according to a second embodiment.

As shown in FIG. 13, the road environment monitoring system 91 according to the present embodiment includes a server device 10B, a plurality of on-board devices 20A and an on-board device 20B. The server device 10B is installed in a cloud, as in the first embodiment. Each of the plurality of on-board devices 20A is mounted in each of a plurality of vehicles V1, and the on-board device 20B is mounted in a vehicle V2. This vehicle V2 is a vehicle approaching a location of an abnormality.

The server device 10B detects an abnormal situation using vehicle behavior data with respect to the on-board devices 20A of the vehicles V1, and requests images including the abnormal situation to the on-board device 20B of the vehicle V2. In other words, the vehicles V1 detecting the abnormal situation and the vehicle V2 to which the images including the abnormal situation is requested are different from each other.

Figure 14:
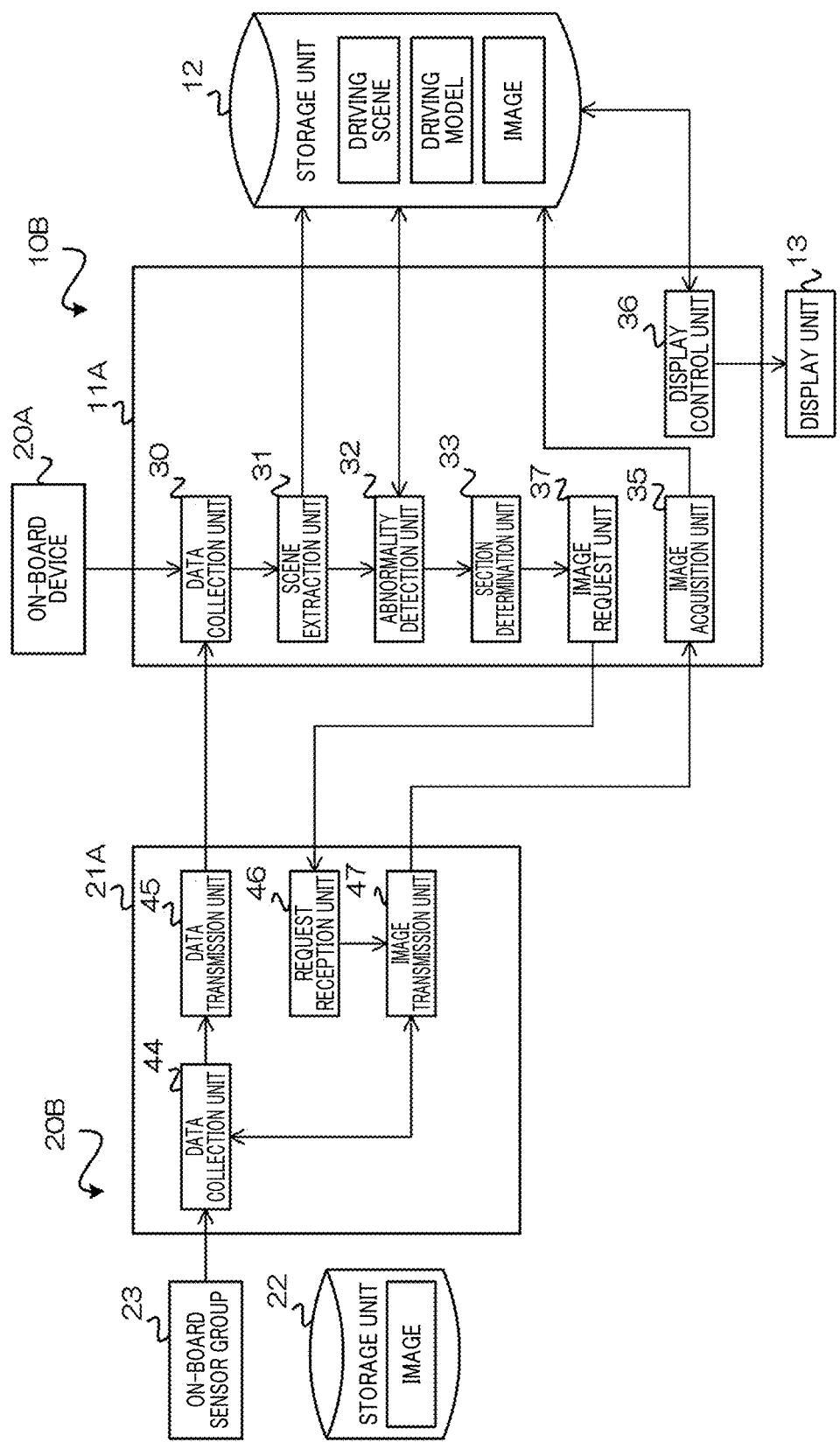
FIG. 14 is a block diagram showing an example of the functional configurations of a server device and an on-board device according to the second embodiment.

FIG. 14 is a block diagram showing an example of the functional configurations of the server device 10B and the on-board device 20B according to the second embodiment. Note that the same reference numerals are added to the components having functions similar to those of the components of the server device 10A and the on-board devices 20A described in the first embodiment, and explanations thereof are omitted.

As shown in FIG. 14, the CPU 11A of the server device 10B according to the present embodiment functions as the data collection unit 30, the scene extraction unit 31, the abnormality detection unit 32, the section determination unit 33, the image request unit 37, the image acquisition unit 35 and the display control unit 36. In addition, the CPU 21A of the on-board device 20B according to the present embodiment functions as a data collection unit 44, a data transmission unit 45, a request reception unit 46 and an image transmission unit 47.

Now, the functional configuration of the on-board device 20B will be described.

The data collection unit 44 repeatedly collects at least images and positional information from the on-board sensor group 23 in a predetermined cycle. However, the data collection unit 44 does not store the collected time-series images in the storage unit 22.

The data transmission unit 45 transmits the positional information collected by the data collection unit 44 to the server device 10B. In the present embodiment, the vehicle behavior data on the vehicle V2 is not utilized, and thus only its positional information is transmitted. However, the vehicle behavior data with which the position and the time are associated may be transmitted.

The request reception unit 46 receives a request for transmission of images according to an abnormal behavior section from the server device 10B.

The image transmission unit 47 transmits the images according to the abnormal behavior section to the server device 10B according to the transmission request received via the request reception unit 46.

Next, the functional configuration of the server device 10B will be described.

The data collection unit 30, the scene extraction unit 31, the abnormality detection unit 32 and the section determination unit 33 determine the abnormal behavior section using the vehicle behavior data collected from the on-board devices 20A, as in the first embodiment.

The image request unit 37 requests the images according to the abnormal behavior section to the on-board device 20B of the vehicle V2 approaching the position associated with the abnormal behavior section determined above.

That is, the server device 10B continuously acquires the positional information of the vehicle V2, and, when detecting that the vehicle V2 is approaching the position of the abnormal behavior section, requests the images according to the abnormal behavior section to the on-board device 20B of the vehicle V2. The on-board device 20B which has received this image request shoots images based on the position defined by the abnormal behavior section, and transmits the images obtained by shooting to the server device 10B.

The display control unit 36 associates the images acquired from the on-board device 20B of the vehicle V2 and the driving scenes with each other based on the time and the position, and performs control to display the images corresponding to the designated driving scene on the display unit 13. In addition, the display control unit 36 may perform control to display the driving scenes corresponding to the abnormal behavior section and at least one of the driving scenes before and after the abnormal behavior section on the display unit 13 in a designatable manner. In this case, when the at least one of the driving scenes before and after the abnormal behavior section is designated, the image request unit 37 requests the images corresponding to the at least one of the driving scenes before and after the abnormal behavior section to the vehicle V2 approaching the position associated with the abnormal behavior section.

Figure 15:
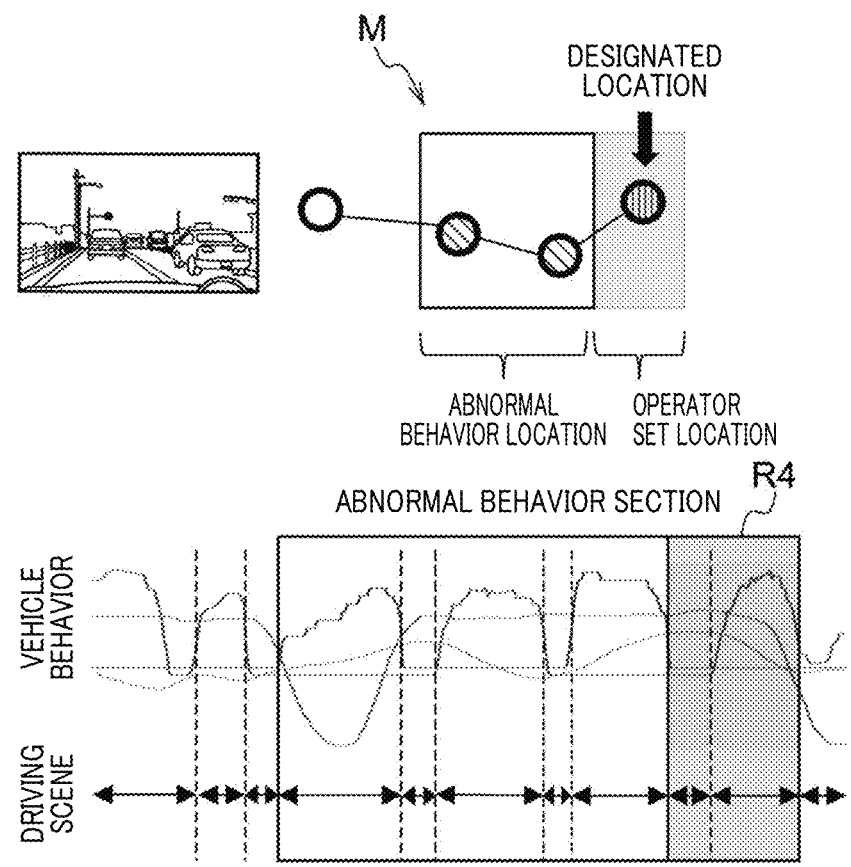
FIG. 15 is a view showing the correlation among images, a map and driving scenes outside the abnormal behavior section according to the embodiment.

FIG. 15 is a view showing the correlation among images, a map and driving scenes outside the abnormal behavior section according to the present embodiment.

The example shown in FIG. 15 indicates the case where the location designated by the user (for example, operator) on the map is not included in the abnormal behavior section. The map M shown in FIG. 15 displays the location corresponding to a section not included in the abnormal behavior section together with the locations corresponding to the abnormal behavior section. The abnormal behavior locations on the map M correspond to the abnormal behavior section, and the operator set location on the map M corresponds to a section R4 not included in the abnormal behavior section. The operator designates, for example, the desired location corresponding to the section R4 on the map M.

For example, the images of the section R4 corresponding to the operator set location might not be able to be acquired if the image storage capacity is insufficient or the engine is stopped in the respective vehicles V1 used in the determination of the abnormal behavior section. In the case, the image request unit 37 requests the images corresponding to the driving scenes associated with the location to the on-board device 20B of the vehicle V2 approaching the location designated on the map M.

FIG. 16 is a view showing the correlation between the images acquired from the vehicle V2 approaching the operator set location and driving scenes according to the present embodiment.

The example shown in FIG. 16 indicates the images acquired from the vehicle V2 approaching the operator set location shown in FIG. 15 and the driving scenes. In the example shown in FIG. 16, images of driving scenes in a section R5 including the location of the abnormality are acquired. Note that only the images of the driving scenes in the section R5 including the location of the abnormality may be acquired, but that images of driving scenes in an abnormal behavior section R6 obtained from the vehicle behavior data associated with the location of the abnormality may be acquired.

Thus, according to the present embodiment, the images are acquired also from the vehicle approaching the location of the abnormality. Therefore, the images containing the abnormal situation can be obtained more reliably.

Third Embodiment

In the present embodiment, a form in which abnormality information and images are displayed in a vehicle approaching a location of an abnormality.

Figure 17:
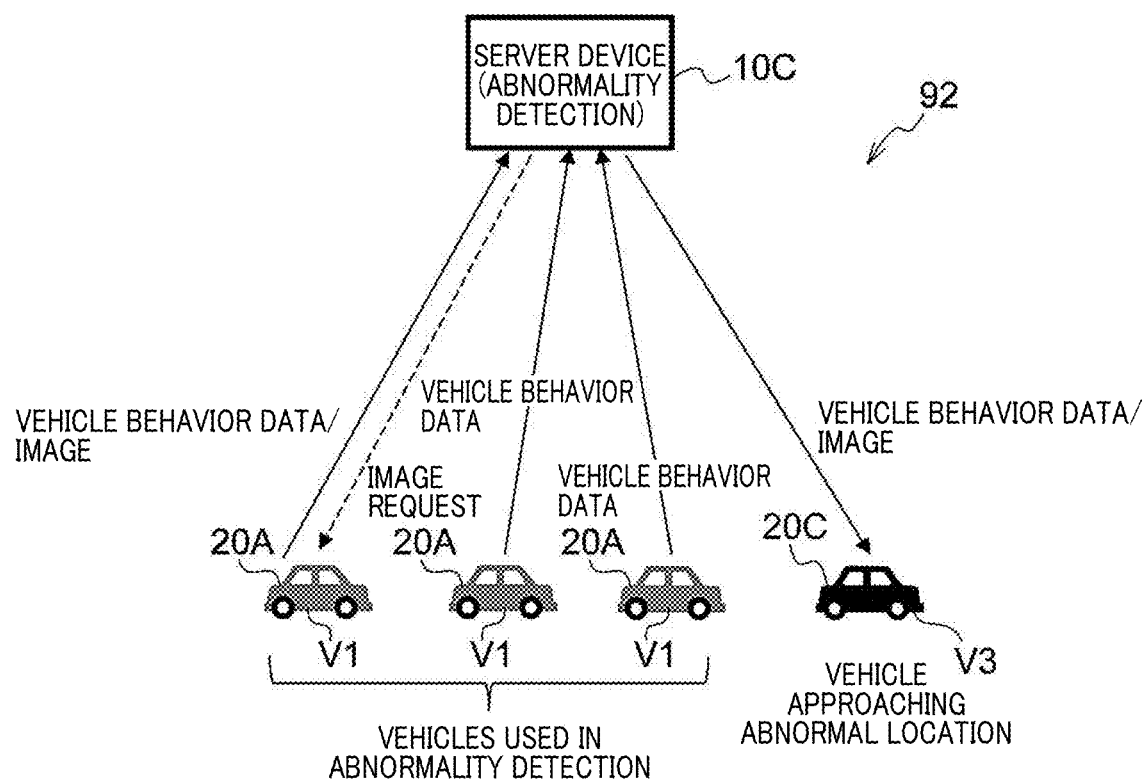
FIG. 17 is a view showing an example of the configuration of a road environment monitoring system according to a third embodiment.

FIG. 17 is a view showing an example of the configuration of a road environment monitoring system 92 according to a third embodiment.

As shown in FIG. 17, the road environment monitoring system 92 according to the present embodiment includes a server device 10C, a plurality of on-board devices 20A and an on-board device 20C. The server device 10C is installed in a cloud, as in the first embodiment. Each of the plurality of on-board devices 20A is mounted in each of a plurality of vehicles V1, and the on-board device 20C is mounted in a vehicle V3. This vehicle V3 is a vehicle approaching a location of an abnormality.

The server device 10C detects an abnormal situation using vehicle behavior data and requests images including the abnormal situation to the on-board devices 20A of the vehicles V1, and transmits abnormality information and the images to the on-board device 20C of the vehicle V3. Briefly, the server device 10C requests the images including the abnormal situation to the vehicles V1 in which the abnormal situation has been detected, and transmits the abnormality information and the images to the vehicle V3 approaching the location of the abnormality.

Figure 18:
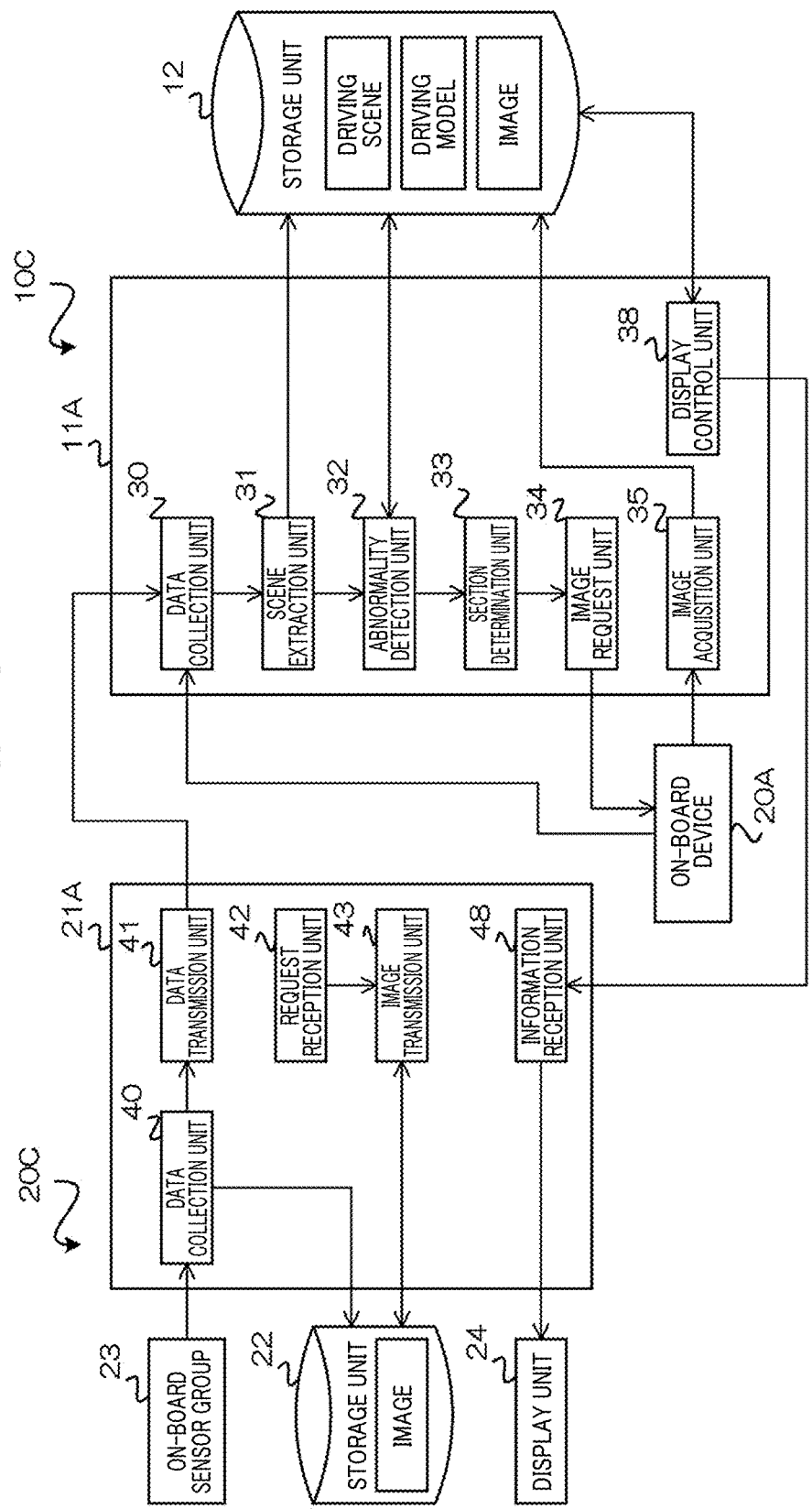
FIG. 18 is a block diagram showing an example of the functional configurations of a server device and an on-board device according to the third embodiment.

FIG. 18 is a block diagram showing an example of the functional configurations of the server device 10C and the on-board device 20C according to the third embodiment. Note that the same reference numerals are added to the components having functions similar to those of the components of the server device 10A and the on-board devices 20A described in the first embodiment, and explanations thereof are omitted.

As shown in FIG. 18, the CPU 11A of the server device 10C according to the present embodiment functions as the data collection unit 30, the scene extraction unit 31, the abnormality detection unit 32, the section determination unit 33, the image request unit 34, the image acquisition unit 35 and the display control unit 38. In addition, the CPU 21A of the on-board device 20C according to the present embodiment functions as the data collection unit 40, the data transmission unit 41, the request reception unit 42, the image transmission unit 43 and an information reception unit 48.

Now, the functional configuration of the on-board device 20C will be described.

The data collection unit 40 repeatedly collects at least images and positional information from the on-board sensor group 23 in a predetermined cycle. The data collection unit 40 stores the collected time-series images in the storage unit 22.

The data transmission unit 41 transmits the positional information collected by the data collection unit 40 to the server device 10C. In the present embodiment, the vehicle behavior data on the vehicle V3 is not utilized, and thus only its positional information is transmitted. However, the vehicle behavior data with which the time and the position are associated may be transmitted.

The information reception unit 48 receives the abnormality information and images acquired from the server device 10C, and displays the received abnormality information and images on the display unit 24.

Next, the functional configuration of the server device 10C will be described.

The data collection unit 30, the scene extraction unit 31, the abnormality detection unit 32, the section determination unit 33, the image request unit 34 and the image acquisition unit 35, similar to the first embodiment, determine the abnormal behavior section using the vehicle behavior data collected from the on-board devices 20A, request the images corresponding to the determined abnormal behavior section to the on-board devices 20A, and acquire the images from the on-board device 20A.

The display control unit 38 transmits the images acquired from the on-board device 20A and the abnormality information obtained by analysis of the images to the on-board device 20C of the vehicle V3 approaching the position associated with the abnormal behavior section, and performs control to display the images on the display unit 24 of the on-board device 20C. As an example, the display unit 24 is configured as a display or head-up display of the car navigation device, as described above.

Figure 19:
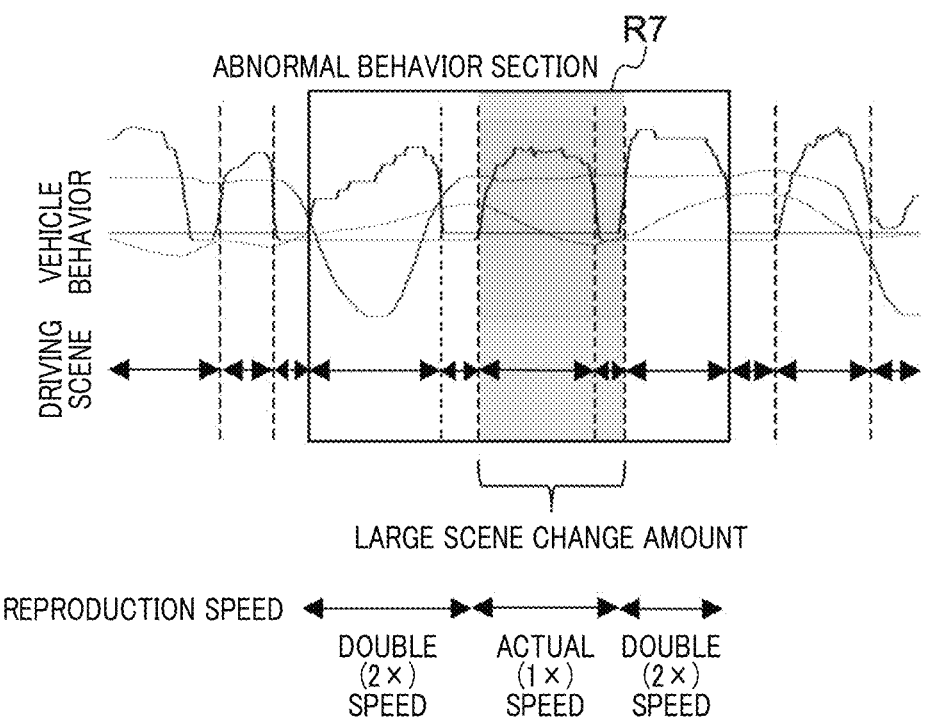
FIG. 19 is a view showing the correlation between driving scenes within an abnormal behavior section and playback speeds according to the embodiment.

FIG. 19 is a view showing the correlation between the driving scenes within the abnormal behavior section and playback speeds according to the present embodiment.

The example shown in FIG. 19 indicates the case where the images are displayed so that a playback speed is an actual speed (1x) only for a location with a large driving scene change amount and a double speed (2x) for the other locations. In this case, when reproducing the images according to the abnormal behavior section, the display control unit 38 performs control to display the images so that the playback speed is the actual speed (1x) for the images of a location where the driving scene change amount is a predetermined amount or more and the double speed (2x) or more for the images of the other locations. In the example shown in FIG. 19, a section R7 included in the abnormal behavior section is a section with a large driving scene change amount. Therefore, the playback speed is set to the actual speed only for the images of the section R7 and set to the double speed for the images of the other sections. As for the estimation of the driving scene change amount, for example, a degree of similarity between the feature amounts (for example, topic proportions) for the previous and following driving scenes is calculated, and, when the degree of similarity is beyond a preset threshold value, the scene change can be judged to be large. The thus-determined images are distributed to the vehicle V3 traveling toward the location of the abnormality and displayed therein. Namely, the images of the section of interest are reproduced at the actual speed, and the images of the other sections are reproduced at the double speed. Therefore, the driver of the vehicle V3 can appropriately grasp the occurrence of the abnormal situation in a short time.

Note that the image display control shown in FIG. 19 is performed with respect to the driver of the vehicle V3, but may also be performed with respect to the operator of the server device 10C.

Thus, according to the present embodiment, the abnormality information and the images are displayed in the vehicle approaching the location of the abnormality. Therefore, the driver of the vehicle can prepare to deal with the abnormal situation.

Fourth Embodiment

In the present embodiment, a form in which some of the functions of the server device are provided on the on-board device side.

Figure 20:
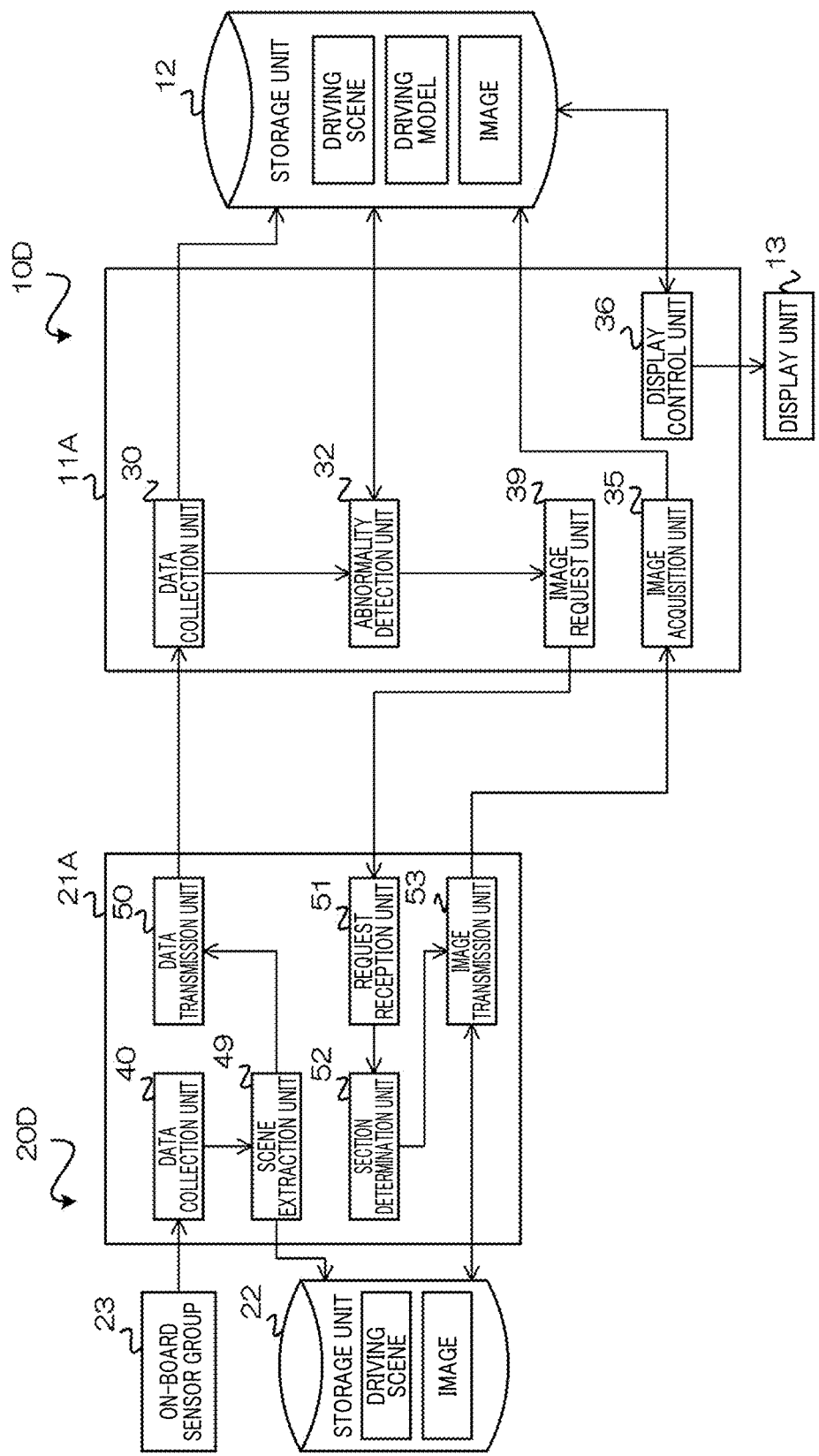
FIG. 20 is a block diagram showing an example of the functional configurations of a server device and an on-board device according to a fourth embodiment.

FIG. 20 is a block diagram showing an example of the functional configurations of a server device 10D and an on-board device 20D according to a fourth embodiment. Note that the same reference numerals are added to the components having functions similar to those of the components of the server device 10A and the on-board devices 20A described in the first embodiment, and explanations thereof are omitted.

As shown in FIG. 20, the CPU 11A of the server device 10D according to the present embodiment functions as the data collection unit 30, the abnormality detection unit 32, an image request unit 39, the image acquisition unit 35 and the display control unit 36. In addition, the CPU 21A of the on-board device 20D according to the present embodiment functions as the data collection unit 40, a scene extraction unit 49, a data transmission unit 50, a request reception unit 51, a section determination unit 52 and an image transmission unit 53. For convenience of explanation, a vehicle mounted with the on-board device 20D is defined as a vehicle V4 (not shown).

Now, the functional configuration of the on-board device 20D will be described.

The data collection unit 40 repeatedly collects vehicle behavior data, images, positional information, time information, and the like from the on-board sensor group 23 in a predetermined cycle. The data collection unit 40 associates the time and the position with the collected vehicle behavior data. The data collection unit 40 stores the collected time-series images in the storage unit 22.

The scene extraction unit 49 extracts driving scenes according to the behavior of the vehicle V4 and a scene feature amount of each of the driving scenes from the vehicle behavior data collected by the data collection unit 40. The extracted driving scenes and scene feature amount of each of the driving scenes are stored in the storage unit 22.

The data transmission unit 50 transmits the driving scenes and scene feature amount of each of the driving scenes extracted by the scene extraction unit 49 to the server device 10D.

The request reception unit 51 receives a request for transmission of images according to an abnormal behavior section together with a driving scene including a location of an abnormality from the server device 10D.

The section determination unit 52 extracts driving scenes satisfying a predetermined condition from among the driving scene including the location of the abnormality and a plurality of driving scenes continuous to the driving scene received via the request reception unit 51, and determines a time range defined by the total continuation time of the extracted driving scenes as the abnormal behavior section. Specifically, the section determination unit 52 extracts driving scenes whose continuation time is less than a threshold value as the driving scenes satisfying the predetermined condition. As an example, this threshold value in this case is an average value of the continuation times of the plurality of driving scenes included in the vehicle behavior data. The image transmission unit 53 retrieves the images according to the abnormal behavior section from the storage unit 22 according to the transmission request received via the request reception unit 51, and transmits the retrieved images to the server device 10D.

Next, the functional configuration of the server device 10D will be described.

The data collection unit 30 collects the vehicle behavior data with which the time and the position are associated from the on-board device 20D of the vehicle V4.

The abnormality detection unit 32 calculates a degree of abnormality which represents an extent of deviation of the scene feature amount of each of the driving scenes extracted by the scene extraction unit 49 of the on-board device 20D relative to a driving model which represents a characteristic of typical vehicle behavior data, and detects a driving scene including a location of an abnormality using the calculated degree of abnormality. The driving model is stored in the storage unit 12 in advance.

The image request unit 39 requests the images according to the abnormal behavior section together with the driving scene including the location of the abnormality to the on-board device 20D of the vehicle V4.

Thus, according to the present embodiment, the data collection unit, the scene extraction unit and the section determination unit are provided on the on-board device side, thereby making it possible to reduce the load of the server device.

The server devices have been exemplified and described as examples of the road environment monitoring device according to the embodiments above. The embodiments may each be a form of a program for causing a computer to execute the functions of the respective units of the server devices. The embodiments may each be a form of a non-transitory recording medium which is readable by a computer in which the program is stored.

The other configurations of the server devices described in the above embodiments are examples, and may be changed according to the situation without departing from the spirit of the invention.

The flows of the processing of the programs described in the above embodiments are also examples, and it is also possible to delete an unnecessary step, to add a new step, or to change the order of the processing, without departing from the spirit of the invention.

In the above embodiments, there has been illustrated the case where the processing according to the respective embodiments is realized using the computer through software configuration by execution of the programs. However, the present invention is not limited to this. The embodiments may each be realized, for example, by hardware configuration or a combination of hardware configuration and software configuration.

What is claimed is:

1. A road environment monitoring device comprising:
   a data collection unit that collects vehicle behavior data which represents behavior of a vehicle and with which time and position are associated;
   a scene extraction unit that extracts, from the vehicle behavior data collected by the data collection unit, driving scenes corresponding to the behavior of the vehicle and a scene feature amount of each of the driving scenes;
   an abnormality detection unit that calculates a degree of abnormality which represents an extent of deviation of the scene feature amount of each of the driving scenes extracted by the scene extraction unit relative to a driving model which represents a characteristic of typical vehicle behavior data, and detects a driving scene including a location of an abnormality using the calculated degree of abnormality;

a section determination unit that extracts driving scenes satisfying a predetermined condition from among the driving scene detected by the abnormality detection unit and a plurality of driving scenes continuous to the driving scene, and determines, as an abnormal behavior section, a time range defined by a total continuation time of the extracted driving scenes;

an image request unit that requests, from the vehicle, one or more captured images according to the abnormal behavior section determined by the section determination unit; and a display control unit that performs control to display the images acquired from the vehicle together with at least one of time, position, and degree of abnormality, according to the request from the image request unit.

2. The road environment monitoring device according to claim 1, wherein
the section determination unit extracts, as the driving scenes satisfying the predetermined condition, driving scenes whose continuation time is less than a threshold value.

3. The road environment monitoring device according to claim 2, wherein
the threshold value is an average value of the continuation times of the plurality of driving scenes included in the vehicle behavior data.

4. The road environment monitoring device according to claim 1, wherein
the section determination unit extracts, from the vehicle behavior data, remaining driving scenes other than driving scenes whose appearance frequency is equal to or more than a threshold value as the driving scenes satisfying the predetermined condition.

5. The road environment monitoring device according to claim 1, wherein
the driving model preliminarily includes a reference continuation time which represents a continuation time as a reference for the driving scenes at each location, and
the section determination unit extract, as the driving scenes satisfying the predetermined condition, driving scenes in which a difference between the continuation time of the driving scenes at each location and the reference continuation time is equal to or more than a threshold value.

6. The road environment monitoring device according to claim 1, wherein
the vehicle comprises a plurality of vehicles,
the data collection unit further collects the vehicle behavior data from each of the plurality of vehicles, and
the image request unit determines the vehicle to which the images are requested, in which the vehicle having the longest abnormal behavior section having a highest priority among the plurality of vehicles.

7. The road environment monitoring device according to claim 1, wherein
the image request unit further requests the images according to the abnormal behavior section to a vehicle approaching the position associated with the abnormal behavior section.

8. The road environment monitoring device according to claim 1, wherein
the display control unit associates the images acquired from the vehicle and the driving scenes with each other based on the time and the position, and further performs control to display the images corresponding to a designated driving scene.

9. The road environment monitoring device according to claim 1, wherein the display control unit further performs control to display and designate the driving scene corresponding to the abnormal behavior section and at least one of the driving scenes before and after the abnormal behavior section.

10. The road environment monitoring device according to claim 9, wherein
when the at least one of the driving scenes before and after the abnormal behavior section is designated, the image request unit further requests the images corresponding to the at least one of the driving scenes before and after the abnormal behavior section to the vehicle having acquired the images corresponding to the abnormal behavior section or a vehicle approaching the position associated with the abnormal behavior section.

11. The road environment monitoring device according to claim 1, wherein
the display control unit displays a map including the location corresponding to the abnormal behavior section, and further performs control to display the images corresponding to the driving scenes associated with the location based on the location designated on the map.

12. The road environment monitoring device according to claim 11, wherein
the map further includes a location corresponding to a section which is not included in the abnormal behavior section, and
the image request unit further requests images corresponding to the driving scene associated with the location to a vehicle approaching the location designated on the map.

13. The road environment monitoring device according to claim 1, wherein
when the images corresponding to the abnormal behavior section are reproduced, the display control unit further performs control to display the images so that a playback speed is an actual speed for the images of a location where a driving scene change amount is a predetermined amount or more and a double speed or more for the images of the other locations.

14. The road environment monitoring device according to claim 1, wherein
the vehicle has an on-board device, and
the data collection unit, the scene extraction unit and the section determination unit are provided in the on-board device.

15. A road environment monitoring system comprising:
an on-board device mounted in a vehicle; and
a road environment monitoring device that conducts a communication with the on-board device, wherein the on-board device includes:
a data transmission unit that transmits vehicle behavior data which represents behavior of the vehicle and with which time and position are associated to the road environment monitoring device, wherein
the road environment monitoring device includes:
a data collection unit that collects the vehicle behavior data transmitted from the on-board device;
a scene extraction unit that extracts, from the vehicle behavior data collected by the data collection unit, driving scenes corresponding to the behavior of the vehicle and a scene feature amount of each of the driving scenes;
an abnormality detection unit that calculates a degree of abnormality which represents an extent of deviation of the scene feature amount of each of the driving scenes extracted by the scene extraction unit relative to a driving model which represents a characteristic of typical vehicle behavior data, and detects a driving scene including a location of an abnormality using the calculated degree of abnormality;

a section determination unit that extracts driving scenes satisfying a predetermined condition from among the driving scene detected by the abnormality detection unit and a plurality of driving scenes continuous to the driving scene, and determines, as an abnormal behavior section, a time range defined by a total continuation time of the extracted driving scenes; and an image request unit that requests, to the on-board device, images according to the abnormal behavior section determined by the section determination unit, wherein the on-board device further includes:

an image transmission unit that transmits images corresponding to the abnormal behavior section of the own vehicle to the road environment monitoring device according to the request from the road environment monitoring device, and the road environment monitoring device further includes:

a display control unit that performs control to display the images acquired from the on-board device together with at least one of time, position, and degree of abnormality.

16. A road environment monitoring program stored in a nonvolatile, non-transitory computer readable medium which causes a computer to execute processing of:

collecting vehicle behavior data which represents behavior of a vehicle and with which time and position are associated;

extracting, from the collected vehicle behavior data, driving scenes corresponding to the behavior of the vehicle and a scene feature amount of each of the driving scenes;

calculating a degree of abnormality which represents an extent of deviation of the scene feature amount of each of the extracted driving scenes relative to a driving model which represents a characteristic of typical vehicle behavior data, and detecting the driving scene including a location of an abnormality using the calculated degree of abnormality;

extracting driving scenes satisfying a predetermined condition from among the detected driving scene and a plurality of driving scenes continuous to the driving scene, and determining, as an abnormal behavior section, a time range defined by a total continuation time of the extracted driving scenes;

requesting, from the vehicle, one or more captured images according to the determined abnormal behavior section; and performing control to display the images acquired from the vehicle together with at least one of time, position, and degree of abnormality, according to the request.

* * * * *